(12) United States Patent
Ravuri

(10) Patent No.: US 9,002,765 B1
(45) Date of Patent: Apr. 7, 2015

(54) STABLE PARALLEL LOOP SYSTEMS

(76) Inventor: Muralidhar Ravuri, Sunnyvale, CA (US)

(*) Notice: Subject to any disclaimer, the term of this patent is extended or adjusted under 35 U.S.C. 154(b) by 593 days.

(21) Appl. No.: 13/295,013

(22) Filed: Nov. 11, 2011

Related U.S. Application Data

(60) Provisional application No. 61/412,554, filed on Nov. 11, 2010.

(51) Int. Cl.
*G06N 3/04* (2006.01)
*G06N 3/08* (2006.01)

(52) U.S. Cl.
CPC . *G06N 3/04* (2013.01); *G06N 3/082* (2013.01)

(58) Field of Classification Search
None
See application file for complete search history.

(56) References Cited

U.S. PATENT DOCUMENTS 5,461,698 A * 10/1995 Schwanke et al. .............. 706/20

OTHER PUBLICATIONS

Goldman, Mark S.; "Memory without Feedback in a Neural Network"; 2009; Elsevier; Neuron 61; pp. 621-634.*
Auda, Gasser et al.; "Modular Neural Networks: A Survey"; 1999; World Scientific Publishing Company; International Journal of Neural Systems, vol. 9, No. 2; pp. 129-151.*

* cited by examiner

*Primary Examiner* — Stanley K Hill
(74) *Attorney, Agent, or Firm* — Spano Law Group; Joseph S. Spano

(57) ABSTRACT

Stable Parallel Loop (SPL) systems and exemplary embodiments are described with reference to both software and hardware platforms. A SPL network includes an input surface, internal nodes, connections that selectively link internal nodes, and an output surface. Signals from the environment are received on the input surface. The received signals excite internal nodes of the SPL network. The internal nodes exhibit their own dynamic behavior. As a result of the interconnected network structure and operational characteristics of each node, dynamic loops are formed among certain internal nodes. A dynamic loop is formed when all of internal nodes within an interconnected loop are active. Output from the SPL network is generated based on the dynamic loops that are formed. Tools to develop and implement a SPL network are presented.

17 Claims, 22 Drawing Sheets

US 9,002,765 B1

STABLE PARALLEL LOOP SYSTEMS

CROSS-REFERENCE TO RELATED APPLICATION

This application claims the benefit under 35 U.S.C. §119 of Provisional Application Ser. No. 61/412,554, filed Nov. 11, 2010, and said provisional application is incorporated herein by reference.

TECHNICAL FIELD

The present disclosure relates to intelligent systems, and more particularly the present disclosure relates to the use of stable parallel loop systems for learning.

BACKGROUND INFORMATION

Dynamical systems interact with the environment by exchanging information and energy. The system receives inputs from the environment, uses them internally, generates outputs in a causal way, and transmits the outputs to the environment. Rather than simply recognizing images and sounds, the architecture of an intelligent system should permit the system to discover patterns in the inputs (e.g., relationships between objects), predict behaviors, and act on those predictions.

Considerable advancements in the design of serial and parallel computers, robotics, and other artificial intelligence systems have been made. Yet, the ability of these systems to exhibit intelligent behavior is still at a primitive state. Some exemplary architectures include artificial intelligence systems based on expert systems. These represent a large collection of rules used to predict a best guess in new situations. A hierarchical temporal memory (HTM) network computes probability distributions by collecting and updating statistics of input sequences to learn their causes and to create beliefs. These are then passed to higher or lower level nodes. Neural network designs train parameters of a specific network structure using special algorithms that try to achieve a desired input-output behavior typically by minimizing a function of the error between the input and the output.

However, improved intelligent systems are desired to perform tasks such as image recognition, sound recognition, speech recognition, autonomous behavior, predictive behavior in environments that vary widely from training scenarios, and autonomous discovery and understanding of the external environment.

SUMMARY

A stable parallel looped system includes an input surface, internal nodes, connections that selectively link internal nodes, and an output surface. The input surface includes input nodes that receive signals from the environment. Some of the internal nodes are excited by signals received from the input nodes. The internal nodes exhibit their own dynamic behavior that ensures that each node will eventually cease to be active after input signals are removed from the system. The internal nodes are interconnected such that dynamic loops are formed among certain internal nodes. A dynamic loop is formed when all of internal nodes within an interconnected loop are active.

In one aspect, dynamic loops are identified as structural loops that persist their dynamics for a period of time after input signals are removed from the system. The period of time is established based on the time it takes for other dynamics within other structural loops to decay to negligible values.

In another aspect, output from an SPL network is generated based on the presence of persistent dynamic loops. An SPL network evolves by increasing any of the number of internal nodes and the number of interconnections among internal nodes to increase the number of persistent dynamic loops in the SPL network.

In yet another aspect, an SPL network is modified to satisfy a similarity condition and a dissimilarity condition to develop intelligent behaviors. In yet another aspect, multiple SPL networks may be merged by satisfying a connectedness condition.

As a SPL network evolves via modifications that comply with the similarity and dissimilarity conditions, the SPL network develops an ability to solve recognition, memory and other learning problems. Memory, recognition, predictive abilities, analysis and decision-making abilities as well as the ability to perform actions through actuators results from the dynamic loop property within an SPL network.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein, as defined solely by the claims, will become apparent in the non-limiting detailed description set forth herein.

DETAILED DESCRIPTION

Reference will now be made in detail to background examples and some embodiments of the invention, examples of which are illustrated in the accompanying drawings.

Figure 1:
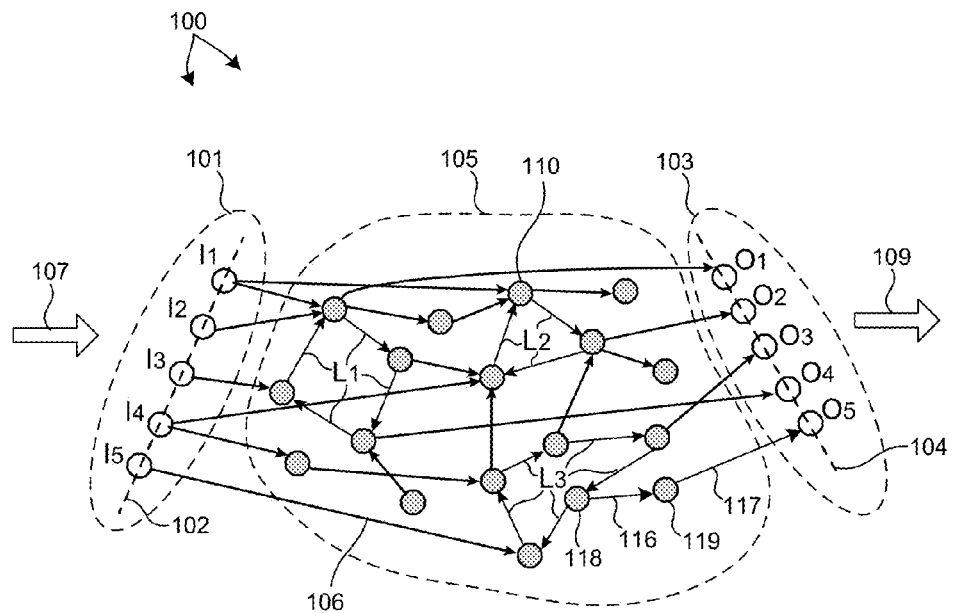
FIG. 1 is a diagram illustrative of a directed graph 100.

FIG. 1 is a diagram illustrative of a static directed graph 100. Static directed graph 100 includes a group of internal nodes 105 and directed connections (e.g., directed connection 106). As depicted in FIG. 1 the directed connections are represented as directed arrows between two nodes. Directed connections 106 are channels (e.g., wires, conduits, pipes, software socket connections or simply software mapping using pointers as member variables within a class) that transmit internal signals from one node to another. Every connection has a source node ($node_i$) and a destination node ($node_j$). A directed pathway is a linear sequence of nodes $n_1, n_2, \ldots, n_k$ in which a directed connection exists from $n_i$ to $n_{i+1}$ for each $i=1, 2, \ldots, k-1$. A non-looped structural pathway is a directed pathway with an origination node and a termination node that are not the same. In other words, the sequence of nodes and connections that comprise a non-looped structural pathway do not form a loop. For example, as illustrated in FIG. 1, an exemplary non-looped structural pathway includes an origination node 118, connection 116 to node 119, and connection 117 to a termination node, node $O_5$. The sequence of nodes and connections do not form a loop, and thus comprise a non-looped structural pathway. A static structural loop (e.g., loop $L_1$) is a closed directed pathway $n_1, n_2, \ldots, n_k, n_1$. The sequence of nodes and connections that comprise the static structural loop form a loop. In other words, a structural loop includes an origination node and a termination node that are the same node (e.g., the closed directed pathway returns to n1). Directed graph 100 illustrated in FIG. 1, includes three static structural loops $L_1$, $L_2$, and $L_3$.

Input nodes 101 (e.g., $inputNodes_i$) take external input signals 107 and generate internal signals. As illustrated in FIG. 1, $I_1, I_2, \ldots, I_5$ are input nodes. An input surface 102 is a group of input nodes that accept input from a specific external signal. For example, one input surface accepts light as an external signal and another input surface accepts sound as an external signal. As illustrated in FIG. 1, the entire set of input nodes $I_1, I_2, \ldots, I_5$ act as a single input surface 102.

External input signals 107 include any signal generated in the external world (e.g., light, sound, special chemical concentrations, vibrations, forces, torques, pressures, etc.). External input signals 107 are communicated to input nodes. In some embodiments, input nodes are considered input transducers. Input transducers 101 convert a physical external signal 107 (e.g., light, sound, etc.) into an internal signal useable by internal nodes 105 of SPL network 100. In some embodiments, input transducers may include microphones (convert sound to electrical signal), strain gauges (convert elongation in length into electrical signals), video camera (convert light pattern into digital signals), touch screens (convert touch signals into electrical signals) and others. As illustrated in FIG. 1, inputs nodes $I_1, I_2, \ldots, I_5$ act as input transducers. In this manner, input nodes 101 serve as an interface between the external environment and the SPL network 100 by converting physical signals into a format useable by internal nodes of SPL network 100.

Output nodes (e.g., $outputNodes_i$) take internal signals and generate external output signals 109. As illustrated in FIG. 1, $O_1, O_2, \ldots, O_5$ are output nodes. An output surface (e.g., output surface 104) is a group of output nodes that generate a specific type of external signal. For example, one external surface generates light patterns (e.g., computer monitor) as an external signal and another output surface generates sound (e.g., speaker) as an external signal. As illustrated in FIG. 1, the entire set of output nodes $O_1, O_2, \ldots, O_5$ act as a single output surface 104.

External output signals 109 include any signal generated by output nodes 103 (e.g., light, sound, special chemical concentrations, vibrations, forces, torques, pressures, etc.). In some embodiments, output nodes 103 are considered output transducers. Output transducers 103 convert an internal signal within the SPL network 100 into an external physical output signal 109. Examples of output transducers include a computer screen (convert a digital pattern corresponding to an image into a pattern of light signals), speakers (convert digital pattern into a sound signal), power amplifiers (convert electrical voltages into physical motion of either the entire system or some subcomponents of it), motors (convert electrical signals into motion), etc. As illustrated in FIG. 1, output nodes $O_1, O_2, \ldots, O_5$ act as output transducers. In this manner, output nodes 103 serve as an interface between the SPL network 100 and the external environment and by converting internal signals into physical signals that affect the external environment.

Figure 3:
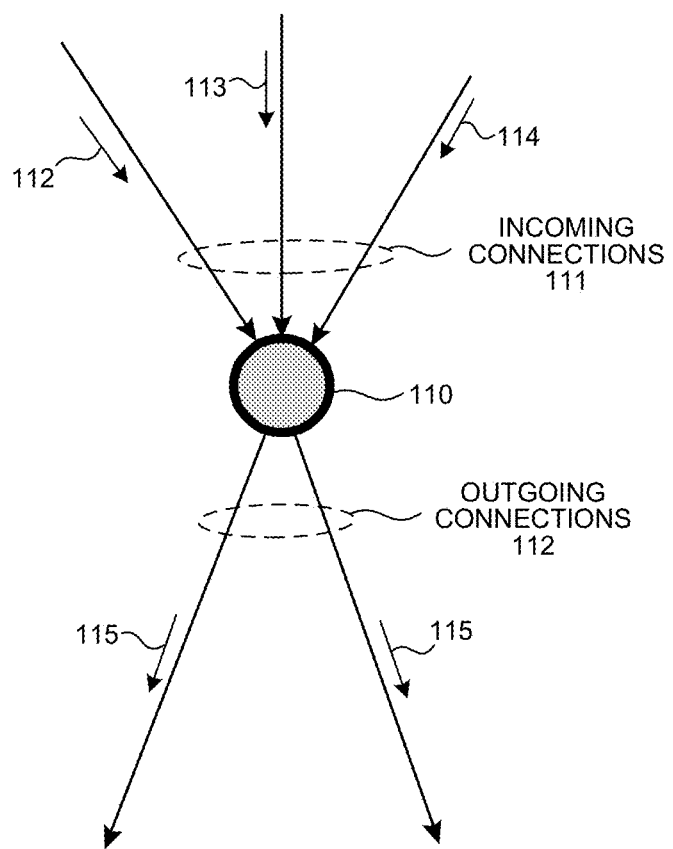
FIG. 3 is a diagram illustrative of an exemplary internal node 110.

In operation, internal nodes 105 process inputs and generate outputs which propagate within the network in a parallel manner. FIG. 3 illustrates an exemplary internal node 110 in operation. Internal node 110 is a junction in the SPL network 100 (represented symbolically as $node_i$, where $i=1, 2, \ldots, N$) with several incoming connections 111 and several outgoing connections 112. Internal node 110 receives incoming signals 112-114 on incoming connections 111, aggregates the signals, and generates a single outgoing signal 115. This outgoing signal is transmitted over each of the output connections 112. Even though a given node has multiple output connections, the information content transmitted over all output connections 112 is the same (i.e. output signal 115). The incoming signals on each of the incoming connections 111, on the other hand, may be different originate as output signals from different nodes.

Signals 112-115 are examples of internal signals. Internal signals are transmitted among different nodes 105 within an SPL network 100. Examples are electrical signals, digital sequences of ones and zeros and flow of chemicals through pipe-like channels. These signals are either outputs transmitted by a given node or inputs received by a node from other nodes within the SPL network.

Each internal node processes inputs and outputs independently of other nodes. Thus, internal nodes operate in parallel. In one embodiment, an internal node is a single CPU with its own clock and with its own speed of operation running within a parallel computer containing multiple CPU's. In another embodiment, an internal node is a thread or a process within a multithreaded single CPU computer.

Figure 2:
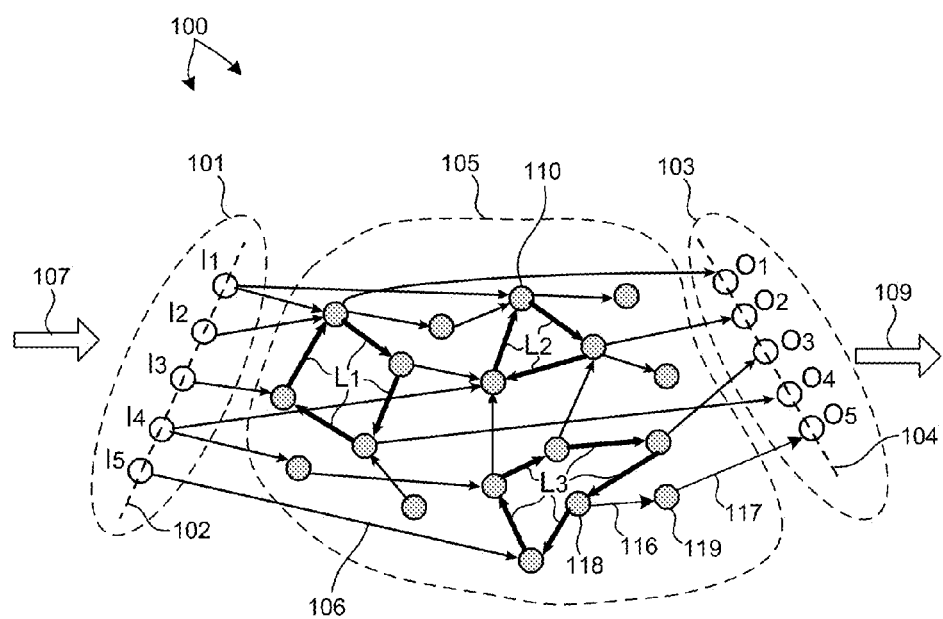
FIG. 2 is a diagram illustrative of directed graph 100 operating as a stable parallel loop (SPL) network 100.

FIG. 2 illustrates the static directed graph 100 in operation as a stable parallel loop (SPL) network 100.

A directed graph or network is dynamical if (a) every node receives one or more inputs (i.e., some form of time-varying data) from neighboring connected nodes, (b) every node sends one or more outputs (i.e., some form of time-varying data) to neighboring connected nodes, and (c) every node in the directed graph performs dynamics in the form of time-varying sequences of steps (e.g., time-varying computations, algorithms, state machines, database triggers, software services or any server processes). In general, the dynamics occurring at a given node are not dependent on the dynamics occurring at another node (i.e., it may behave as a parallel system).

Two types of dynamics occur within a dynamical directed network. The first is the dynamics that occurs within each node (i.e., internal dynamics within a node). The second is the dynamics that occurs across a pathway of nodes (i.e., a flow within the network). For example, if you take a given pathway of nodes, data that is received, generated and transmitted whenever each node in the pathway runs its dynamics flows from one node to another 'along' this connected pathway. The second type of dynamics flowing along different sets of pathways can be monitored for any given period of time. It is the second type of dynamics, i.e., flows, that is used to define dynamical loops.

If the embodiment of a given node is a hardware chip or an input-output mechanical system, the dynamics corresponds to physical dynamics. For example, if the node is a motor or a pump, its dynamics refers to taking a set of external input signals (e.g., fluid or electrical voltages) into the pump, performing internal dynamics and then generating a set of output signals (e.g., fluid, electrical voltages, rotation, other types of physical motion or work). These outputs are then transmitted to neighboring nodes. If the embodiment of a node is an executable program in a computer, then the node dynamics corresponds to abstract computations performed in a sequential manner. This computational dynamics has similarities to a 'state machine' in the computer science literature.

If no data flows through a given static structural loop, then such a loop is not a dynamical loop. This situation can occur even if every node in the network is continuously running its internal dynamics. For example, this may happen when (a) one or more nodes are not receiving any inputs from the neighboring connected nodes, (b) one or more nodes have not met some internal conditions to generate outputs, (c) an output buffer of a given node is full and cannot transmit more data, etc.

A node is said to be active (i.e., dynamical) if it generates outputData at a given instant. It is said to be idle (i.e., static) if it does not generate any outputData at that instant. As depicted in FIG. 2, if $I_1$, $I_2$ and $I_3$ are the only input nodes that receive external inputs and if they generate outputData, then all nodes within the loops $L_1$ and $L_2$ are active or dynamical whereas all nodes within loop $L_3$ are idle or static. If external input signals 107 fall on input nodes $I_4$ and $I_5$ only, then all nodes within the loops $L_2$ and $L_3$ will be triggered to produce output signals on output nodes $O_2$, $O_3$, and $O_5$.

In FIG. 2, if inputs $I_1$, $I_2$ and $I_3$ do not receive any external input, $L_1$ is considered to be a static loop because no signals are actively passing through the closed directed pathway. Static loops and, more generally, static pathways are composed of entirely idle nodes. If no internal signal propagates through a closed directed pathway, it is not a dynamical loop.

If an internal signal propagates through any closed directed pathway, then it is a dynamical loop. Dynamical loops and, more generally, dynamical pathways are composed of entirely active nodes. In FIG. 1, if $I_1$, $I_2$ and $I_3$ are the only input nodes that receive external inputs, then $L_1$ and $L_2$ are dynamical loops whereas $L_3$ is a static loop.

The number of nodes that are part of a given static or dynamical loop is termed as the loop length. For example, in FIG. 2, the loop length of $L_1$ is 4, $L_2$ is 3 and $L_3$ is 5.

A dynamical directed network is said to be a stable parallel looped (SPL) network if it includes at least one persistent dynamical loop and the output from the SPL network is generated based on the persistent dynamical loops. Persistent dynamical loops exist if and only if there is a closed directed pathway along which data flows continuously for a finite amount of time even if all external inputs are removed.

A SPL network forms and maintains a set of dynamic loops (e.g., dynamic loops $L_1$, $L_2$, and $L_3$ illustrated in FIG. 2) when subject to an input pattern and small variations of the input pattern. In addition, the same SPL network forms and maintains a different set of dynamic loops when subject to a substantially different input pattern. Furthermore, the output of a SPL network is based on the persistent dynamic loops.

In addition to persistent dynamical loops, a SPL network also contains non-looped structural pathways. If the origination node is part of a persistent dynamical loop, then the non-looped structural pathway is capable of generating an output from the persistent dynamical loop extending outwards. If the termination node is part of a persistent dynamical loop, then the non-looped structural pathway is capable of supplying inputs to the persistent dynamical loop. If the origination node is part of one persistent dynamical loop and the termination node is part of a second persistent dynamical loop, then the resulting pathway is capable of transmitting the dynamical outputs from the first dynamical loop to the second dynamical loop.

The output of a SPL network is comprised of output signals generated by a set of output nodes. In some situations, these output nodes can be part of persistent dynamical loops. In other situations they could be termination nodes of pathways originating from persistent dynamical loops.

The output of a SPL network is based on the dynamic loops detected within the SPL network during operation. A loop detector tool detects any persistent dynamic loops within the network as the signals propagate in response to an input or otherwise. In FIG. 2, if $I_1$, $I_2$ and $I_3$ are the only input nodes that receive external inputs, then the loop detector should detect $L_1$ and $L_2$ as valid dynamical loops, but not $L_3$. On the other hand, if $I_4$ and $I_5$ are the only input nodes that do receive external inputs, then the loop detector should detect $L_2$ and $L_3$ as valid dynamical loops, but not L.

When an external input signal falls on the input surface for a short period, inputData propagates within the network. Some regions within the SPL network will persist for a while even after the external inputs are removed. The SPL network is tuned such that the dynamic loops persist for a longer period of time than any other dynamics within SPL network 100. In one example, persistent dynamic loops may be distinguished from all other dynamics based on their persistence for a period of time that is at least five times longer than any other dynamics. Thus, a loop detector can detect persistent dynamic loops in a SPL network by waiting for a period of time that is at least five times longer than the expected decay time for all nonlooped dynamics and then record all the active nodes. These nodes represent the dynamical loops within the network for a given external input, and the output of the SPL network is generated from these nodes. Although, a period of time that is at least five times longer than any other dynamics is useful to identify persistent dynamic loops, other period of time may be contemplated (e.g., any period of time that is two times longer than any other dynamics).

In one embodiment, the loop detector tool walks through all the nodes of the dynamical SPL network and detects the active nodes. Then the loop detector tool uses the static connection information of the network (i.e., the inputMap and outputMap of all nodes) to determine which subsets of the detected active nodes are interconnected and which ones are not. In other words, the set of detected active nodes can be partitioned into disjoint subsets, each of which is connected. For example, in FIG. 2, if the external inputs fall on $I_1$, $I_2$ and $I_3$, the dynamical SPL network will have seven persistent active nodes. These seven nodes can be partitioned into two disjoint sets—one with 4 nodes and the other with 3 nodes. These two disjoint sets correspond to loops $L_1$ and $L_2$ respectively. Even though $L_1$ and $L_2$ are connected when viewed as part of the entire network, there is no closed pathway from a node in $L_1$ to nodes in $L_2$, which then brings it back to $L_1$ nodes. In this manner, the loop detector tool detects the dynamic loops within the SPL network.

The aforementioned loop detector tool is provided by way of example. However, other algorithms may be contemplated. For example, a more direct approach is to walk through the interconnections, as the dynamics occurs to record the looped pathways. Similarly, if we have a visual representation of the network dynamics, dynamical loops can be manually detected either in real time or during the simulation of the dynamics at a later time.

Figure 31:
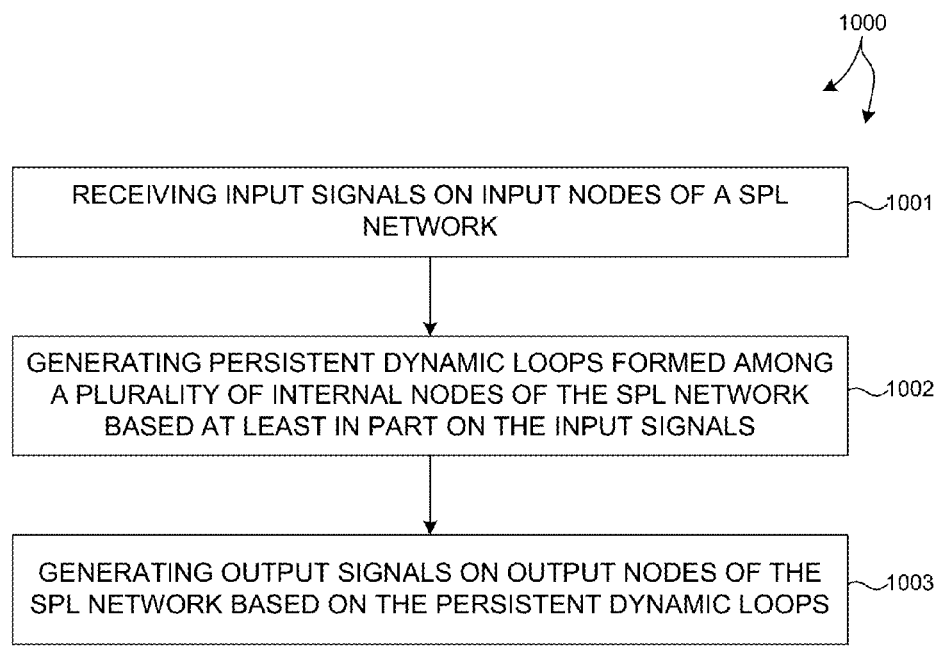
FIG. 31 illustrates a method 1000 of operation of a SPL network 100.

FIG. 31 illustrates a method 1000 of operation of a SPL network 100. In block 1001, input signals are received on a plurality of input nodes of a SPL network. In block 1002, a plurality of persistent dynamic loops are generated among a plurality of internal nodes of the first SPL network based at least in part on the plurality of input signals. In block 1003, a plurality of output signals are generated on a plurality of output nodes of the SPL network based on the plurality of persistent dynamic loops.

Node Operation

Figure 4:
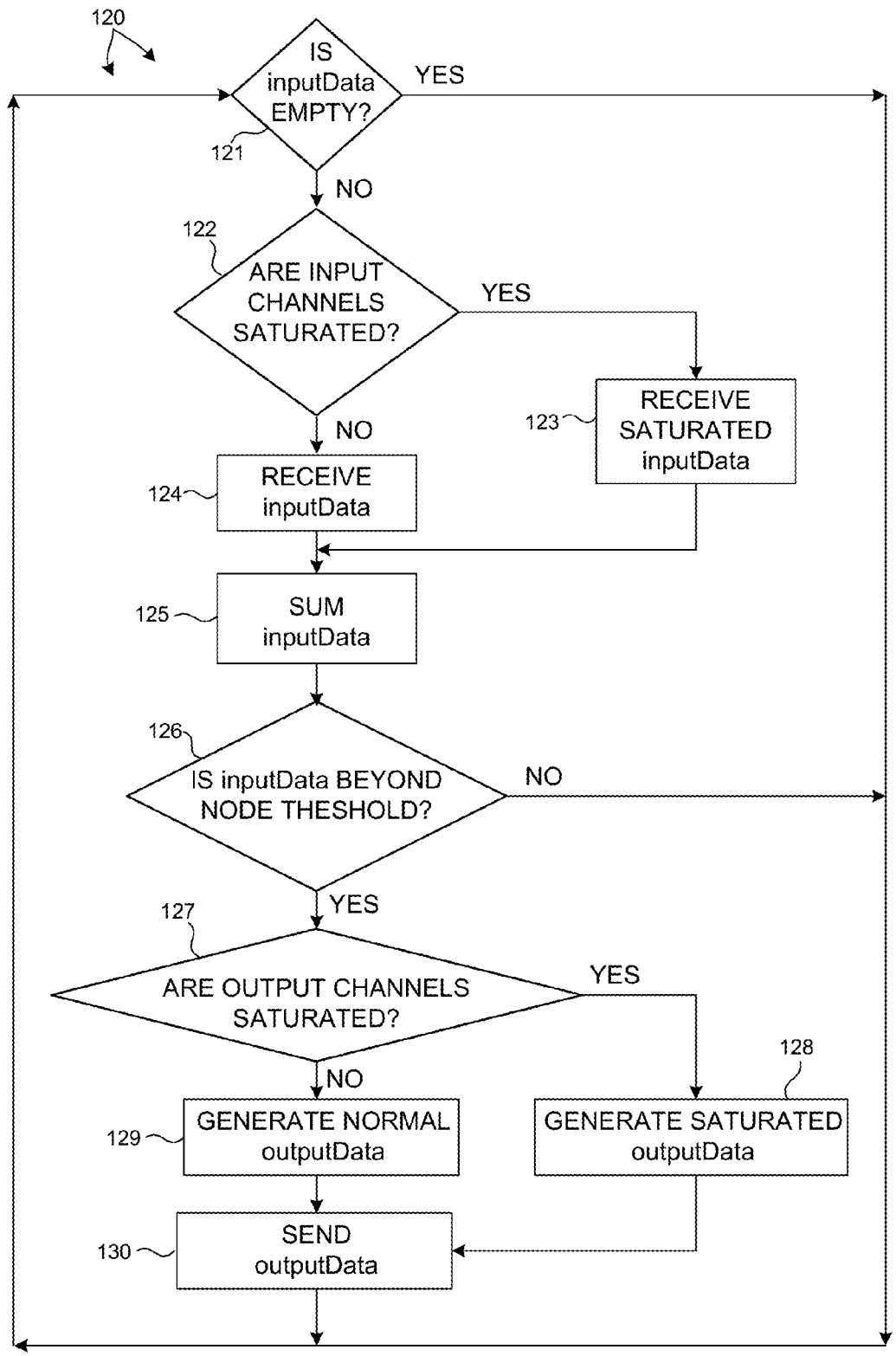
FIG. 4 is a flowchart diagram illustrative of an exemplary method 120 of operation of a node as an infinite loop.
Figure 14:
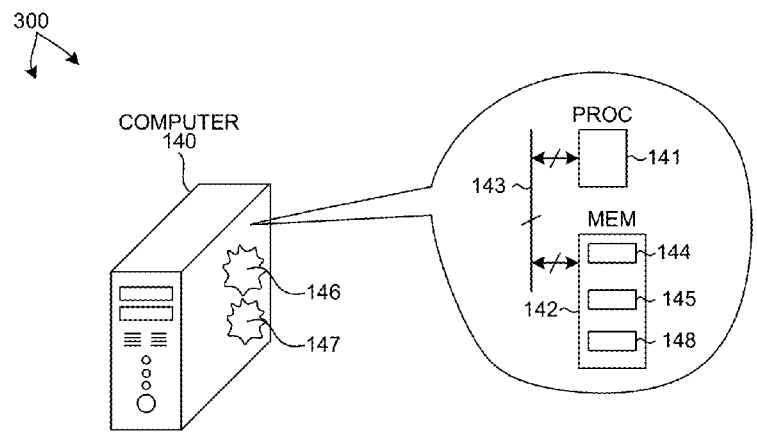
FIG. 14 is a diagram illustrative of a stable parallel loop system 300 in one embodiment that is operable to implement tools useful to develop and implement a SPL network 100.

Each node of an SPL network 100 implements a particular set of operating rules that specifies how a node receives incoming signals and generates outgoing signals. FIG. 4 illustrates an exemplary method 120 of operation of a node as an infinite loop. In one embodiment (e.g., any of the embodiment illustrated in FIGS. 14 and 16-19), SPL software instructions 144 stored in a memory 142 are executed by a processor 141 causing processor 141 to implement exemplary method 120. As depicted in FIG. 14, the operation of method 120 for each node runs on a single thread. By way of example, the method 120 as applied to node 110 is executed on thread 1.

Figure 5:
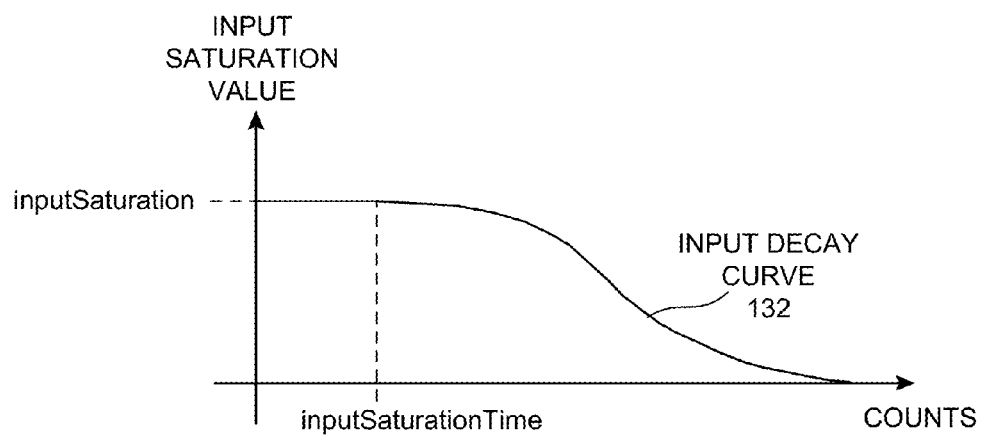
FIG. 5 is a diagram illustrative of an input decay curve 132.

In block 121 node 110 determines whether an incoming signal (e.g., any of incoming signals 112-114) is present is present on an incoming connection. If an incoming signal is present, in block 122, node 110 checks if the incoming signal exceeds an input saturation value determined by an input decay curve 132 illustrated in FIG. 5. The input saturation value is determined from input decay curve 132 based on the number of iterations of the method 120. At each iteration of method 120, an input counter value is incremented. As illustrated in FIG. 5, for a relatively small count value, the input saturation value is simply an input saturation parameter value (e.g., inputSaturation). However, as the counter reaches or exceeds a predetermined number of counts (e.g., parameter iutputSaturationTime), the input saturation value is determined by an input decay curve. This input decay curve is a tunable curve. The input decay curve 132 applies to all incoming signals. Thus, input data accumulation is subject to a slow decay during operation of method 120.

If the input saturation value is exceeded, by the incoming signal, in a block 123, node 110 receives the saturated input value (e.g., as inputData). If the input saturation value is not exceeded, in block 124, node 110 receives incoming signals (e.g., $data_{ij}$ where i and j reminds us that the incoming signal was sent from $node_j$ to $node_i$) present on incoming connections 111. The list of incoming connections associated with node 110 is stored in its static inputMap. By way of example, node 110 collect incoming signals 112-114 on incoming connections 111. Node 110 waits for a short time (e.g., for a time period specified by parameter inputDelay, where input delay may be zero). Node 110 resets the incoming connections to zero to indicate that the incoming signals are received. In block 125, node 110 determines the sum of all input signals ($\Sigma_j data_{ij}$). In block 126, node 110 determines if the sum exceeds a node threshold value. If the sum does not exceed a node threshold value, node 110 checks for new incoming signals. If the sum exceeds a node threshold value, node 110 waits for a short time (e.g., for a time period specified by parameter outputDelay, where the output delay may be zero). In block 127, node 110 checks if the sum exceeds an output saturation parameter value (e.g., parameter outputSaturation).

If the output saturation parameter value is exceeded, in a block 128, node 110 sets the outgoing signal (e.g., parameter outputData) at an output saturation value determined by an output decay curve 131 illustrated in FIG. 5. Furthermore, node 110 increments an internal counter to count the number of times that outputData is set to the output saturation value. For example, as illustrated in FIG. 5, the output saturation value is determined based on the number of consecutive times that the outgoing signal has exceeded the output saturation parameter value (e.g., parameter outputSaturation). As illustrated in FIG. 5, for a relatively small count value, the output saturation value is simply the output saturation parameter value. However, if the counter reaches or exceeds a predetermined number of counts (e.g., parameter outputSaturationTime), the output saturation value is determined by an output decay curve. The output saturation curve is a tunable curve. In block 130, the outgoing signal is sent over each of the outgoing connections 112 associated with node 110.

If the outgoing signal does not exceed the output saturation parameter value (e.g., parameter outputSaturation) node 110 sets the outgoing signal (e.g., parameter outputData) at a normal output value determined by an output scaling factor multiplied by the difference between the sum of the input signals and the node threshold value. The outgoing signal is communicated over each of the output connections 115.

One important observation is that a given node 110 does not generate any outputData during one iteration of method 120 if the sum of the inputs ($\Sigma_j data_{ij}$) is below the threshold value. When this happens node 110 is said to be in an idle state. If the opposite happens and node 110 does generate outputData, it is said to be in an active state. A dynamical SPL network with 100 nodes each running on 100 threads on a computer, as illustrated in FIG. 14, implies that the internal data keeps propagating within the network continuously until all the propagating data decays to zero (through the inputDecay and outputDecay curves) or falls below the threshold values of the nodes. If external inputs are not constantly supplying data into the network, all data within the network will eventually die down (or drop down to zero). However, not all nodes will stop outputting data simultaneously. Some of the nodes will continue their dynamics (e.g., non-zero input and outputData generation) for a long time, while others decay to zero quickly. In this manner, persistent nodes arranged in a closed directed pathway form persistent dynamic loops.

A dynamic loop is a node pathway that forms a loop where all nodes within the loop are outputting data (i.e., their total input exceeds their respective threshold values). This set of nodes persists for a longer period of time than other node pathways, and thus forms a persistent dynamic loop. This is in contrast to sets of nonlooped structural pathways of nodes. The dynamics of nodes in nonlooped structural pathways decay as the data propagates from one end of the pathway to the other end.

The aforementioned embodiment of method 120 as illustrated in FIG. 4 describes the operation of a single node on a single thread in a computer. Each node in an SPL network runs on its own thread (or within a thread pool) operates in an analogous manner. If there are one hundred nodes in a graph network, the parent process instantiates one hundred different threads, one for each node to run its dynamics repeatedly and independently. In another embodiment, it is possible to share a given thread across a small group of nodes (e.g., one thread assigned to 10 nodes). The dynamics in this case are performed in a round-robin manner across these 10 nodes or using any other thread-pooling or scheduling algorithm (like shortest remaining time, using user-specified priorities, using random number generator and multilevel queuing).

SPL Network Tuning

As described herein, dynamic loops are the basis for generating output from a SPL network. Furthermore, identifying different dynamical loops associated with different input conditions forms the basis of a SPL network that exhibits intelligent behavior. If an SPL network becomes fully active (i.e., all of the nodes of a SPL network are in an active state) a SPL network is not able to exhibit intelligent behavior because no distinguishable dynamic loop patterns can be identified. For example, if a SPL network is used to recognize two distinct images, a fully active network will fail in this task because the SPL network looks the same for both images (i.e., the entire network is in a uniformly active state for both images).

Figure 6:
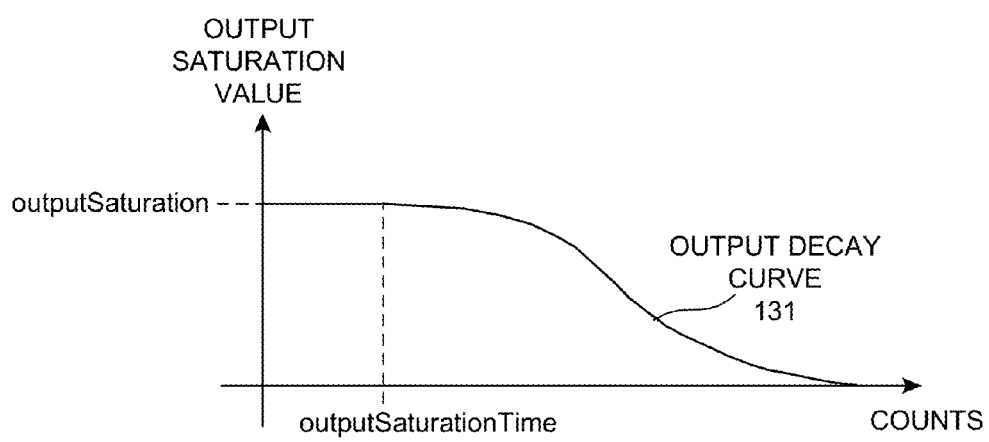
FIG. 6 is a diagram illustrative of an output decay curve 131.

Steps must be taken to avoid a fully active network. One way to satisfy this requirement is to ensure that dynamical loops die down fast enough. To do this we need to tune the set of parameters mentioned earlier for the current embodiment. As discussed with reference to FIGS. 4-6, each node includes a set of tunable parameters including inputDelay, outputDelay, the inputSaturation curve, inputSaturationTime, outputSaturation curve, outputSaturationTime, node threshold value, and outputScalingFactor.

The values of the tuning parameters are not universally fixed for all situations. They depend on the specific embodiment of the dynamical SPL network. For example, if the SPL network is implemented on a single CPU computer, the set of factors that affect the tuning include the clock speed of the computer, whether it uses 32-bit or 64-bit architecture, the sizes of L1 and L2 cache, the number of cores in the CPU, the maximum number of simultaneous threads, available memory, memory speed, etc. If the SPL network is implemented on a multiple CPU machine, the aforementioned factors apply in addition to the number of processors, processor speeds, communication speeds between processors, etc. If the SPL network is implemented in a distributed environment, network bandwidths, network latencies, communication protocol between computers (e.g., XML based, HTTP, HTTPS, etc.), synchronization overhead, etc. are important factors as well.

A number of methods to tune the available parameters to avoid a fully active network may be contemplated. One approach is described herein. However, a person skilled in the art will find other ways to achieve the same objective.

In a first step, generate a number of random SPL networks each with a total number of nodes ranging, for example, from ten to one hundred. Some of the generated SPL networks should have no closed directed pathways (i.e., a network having a tree structure instead of a graph structure), some should have a few closed directed pathways, and others should have a larger number of closed directed pathways. As the connection density of a SPL network increases, more closed directed pathways will be generated. For the SPL networks with closed directed pathways, choose the loop lengths to range, for example, from three to twenty. Longer loop lengths (i.e., beyond 20) are uncommon and can be decomposed into smaller closed directed pathways.

In a next step, supply external inputs to each of the random SPL networks with closed directed pathways. After a few dynamic loops are triggered, remove the external inputs. After removing the external inputs, measure the amount of time each dynamic loop persists. For the random SPL networks with non-looped pathways, measure the amount of time it takes for the dynamics to pass from one end of the pathway to the other.

In a next step, tune the node parameters such that the time that the dynamical loops persist is, by way of example, at least ten times the time it takes the dynamics to traverse the non-looped pathways. In examples where a human monitors the network, it beneficial to tune the parameter such that the dynamical loops persist for a few seconds. If the loops persist for only a few microseconds, a human will not be able to monitor the network, however, this may be suitable for an automated system.

Understanding the relationship between node parameter values and the resulting persistence of the dynamic loops is helpful to guide the tuning process. For example, as the node threshold in increased, dynamic loops decay more quickly, and vice-versa. In another example, as inputDecay is increased, dynamic loops decay more quickly, and vice-versa. In another example, as inputSaturation and outputSaturation are increased, dynamic loops remain active longer and vice versa. In another example, as inputDelay and outputDelay are increased, the dynamic loops decay more quickly, and vice-versa. The parameter outputScalingFactor should be strictly less than one to ensure stability of the dynamic loops. If outputScalingFactor is greater than one, there will be magnification of the outputData, which will eventually push the outputData to infinity as the dynamic loops repeat several times.

In some examples it is advisable to initially tune the parameters for all nodes to the same values. However, the parameter values of each node may be changed randomly in a small neighborhood of these previously tuned parameter values (e.g., +/−5% of the original values).

As a SPL network is modified, the density of network connections should remain small enough to avoid a fully active network. To avoid excessive network density, new nodes should be added to the SPL network instead of just adding new connections to the existing network. As the number of nodes increases, opportunities for new, unique pathways increase while maintaining a low connection density. This increase in nodes allows for more unique dynamical loops. This enables the solution of more complex problems without increasing the connection density and the risk of a fully active network.

A number of tuning mechanisms and parameters have been described in detail in one embodiment. However, a person skilled in the art knows that several variations to these curves and tuning parameters are possible as extensions to the basic design described here. The detailed description for one embodiment should not be viewed as restricting the invention. Rather, it is meant to clarify the invention by using just a minimal set of features.

SPL Network Evolution

A SPL network 100 starts with a random initial network. To realize a SPL network that exhibits problem solving behavior the SPL network is modified to increase the size/complexity of the network by introducing structure unique to a given problem of interest.

A SPL network may be modified in two ways. In one approach a training data set is repeatedly employed to guide the evolution of the network. In another approach, exposure to actual environmental inputs guides the evolution. All modifications to the network (e.g., adding/deleting nodes and adding/deleting directed connections) ensure that the set of dynamical loops stay nonempty at all times.

A SPL network is trained for a given training set if and only if (a) each distinct element from the training set (e.g., images, sounds, videos, events, actions and others) generates a uniquely distinguishable set of dynamical loops and (b) small variations of a particular element of the training set (e.g., geometric and dynamical transformations) produce a common dynamical loop.

Condition (a) distinguishes two different objects as different by satisfying a dissimilarity condition.

Condition (b) identifies two similar objects, with minor variations, as the same by satisfying a similarity condition. A trained SPL network must satisfy both conditions.

In one example, the similarity condition is satisfied for an image A within a training set. Several variations of image A (e.g., small translations, rotations, deformations and dynamical variations) exist within a training set. These variations are represented as $A_1, A_2, \ldots, A_n$. When the input surface is subject to each of these images for a short while and then removed, the initial random SPL network generates a set of dynamical loops ($\mathcal{L}_1, \mathcal{L}_2, \ldots, \mathcal{L}_n$, respectively). It may be that the dynamical loops for all of $A_1, A_2, \ldots, A_n$ are distinct from each other. All of these images are supposed to represent the same image A, but there are no common set of dynamical loops among them (i.e., $\mathcal{L}_1 \cap \mathcal{L}_2 \cap \ldots \cap \mathcal{L}_n = L = \emptyset$. To satisfy the similarity condition, $\mathcal{L}$ must be nonempty. This nonempty intersection (i.e., the common set of dynamical loops) is used to uniquely identify the image A in spite of minor geometric and dynamical variations. To satisfy the similarity condition, the initial SPL network must be modified to realize a nonempty intersection $\mathcal{L}$ of dynamical loops for image A.

Figure 7:
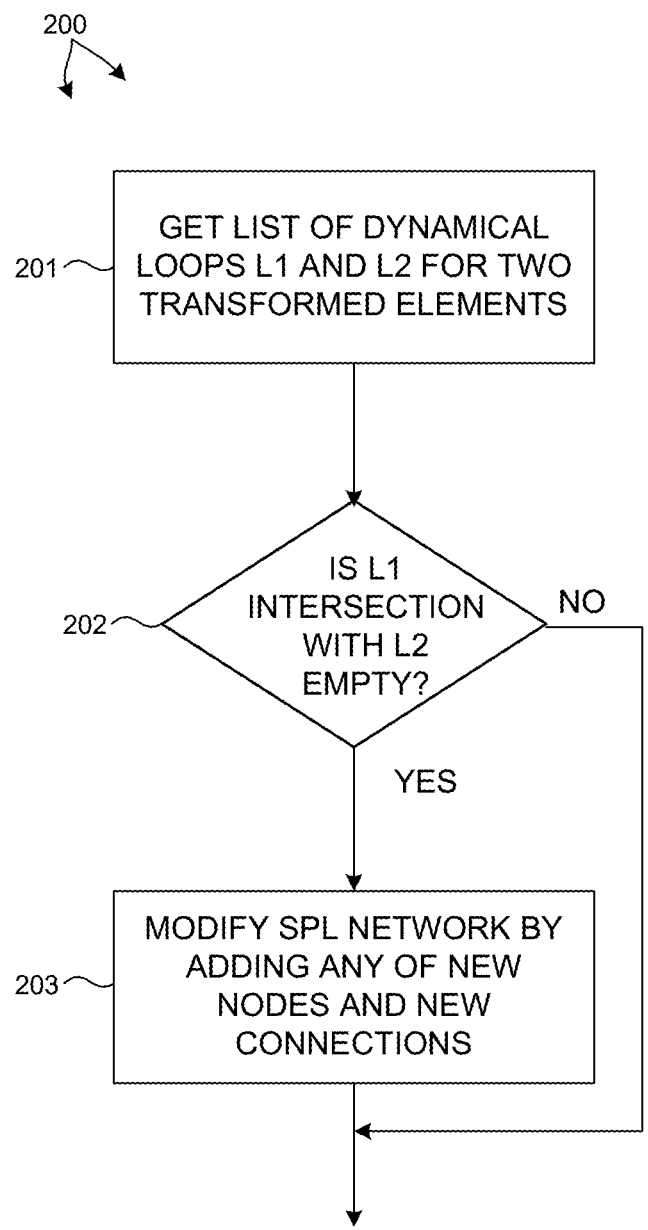
FIG. 7 is a flowchart diagram illustrative of a method 200 of modifying a SPL network to satisfy the similarity condition.

FIG. 7 illustrates an exemplary method 200 of modifying a SPL network to satisfy the similarity condition. In block 201, a list of dynamical loops $\mathcal{L}_i$ triggered within the SPL network (for i=1, 2, . . . , n) for each transformed image $A_i$ is generated. Take a pair of images $A_1, A_2$ and the corresponding set of loops $\mathcal{L}_1$ and $\mathcal{L}_2$. In block 202, it is determined whether the intersection of loops $\mathcal{L}_1$ and $\mathcal{L}_2$ is empty. If $\mathcal{L}_1 \cap \mathcal{L}_2 \neq \emptyset$, there is no need to modify the SPL network. If $\mathcal{L}_1 \cap \mathcal{L}_2 = \emptyset$, the SPL network must be modified by any of adding new nodes and adding new connections (block 203). This method 200 is repeated pairwise for each of the images $A_i$.

Figure 8:
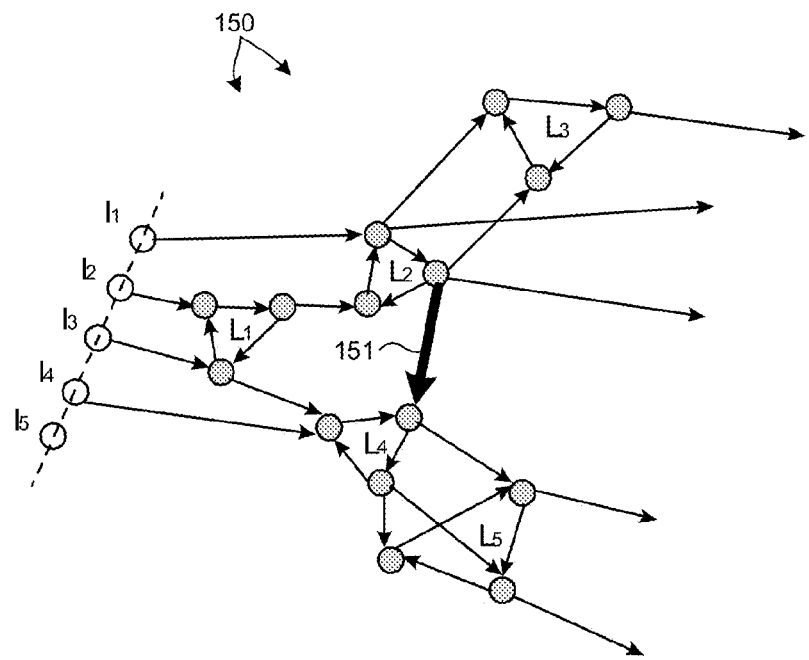
FIG. 8 is a diagram illustrative of a portion 150 of a SPL network in one embodiment.

The SPL network may be modified by adding connections, adding nodes, or both. FIG. 8 is illustrative of a portion 150 of a SPL network in one embodiment. In one example, portion 150 is modified by adding connections. For example, new connections may be added from nodes in $\mathcal{L}_1$ to nodes in $\mathcal{L}_2$ that are close to each other (computed using the distance method). As an example, consider $\mathcal{L}_1 = \{L_1, L_2, L_3\}$ and $\mathcal{L}_2 = \{L_4, L_5\}$ with no node common between $\mathcal{L}_1$ and $\mathcal{L}_2$. From the list of loops $L_1$-$L_3$ and $L_4$-$L_5$, pick any two loops, one from each set. The choice may be random or more structured (e.g., choosing the distance between the pairs to be close enough using a distance method). Once two loops (e.g., $L_2$ and $L_4$) are selected, a new connection 151 is created between two of the nodes within the loops, say, from a node in $L_2$ to a node in $L_4$. You may even create two connections in both directions ($L_2$ to $L_4$ and $L_4$ to $L_2$). With this new connection, a nonempty intersection of loops (i.e., $\mathcal{L}_1 \cap \mathcal{L}_2 \neq \emptyset$) is guaranteed. After this modification of the SPL network, the SPL network may be rerun with the training inputs for $A_1, A_2$ and the list of loops is updated. For the new SPL network, we now have $\mathcal{L}_1 = \{L_1, L_2, L_3, L_4\}$ and $\mathcal{L}_2 = \{L_4, L_5\}$. If we included a connection in the reverse direction as well, then $\mathcal{L}_2 = \{L_2, L_4, L_5\}$. Therefore, $\mathcal{L}_1 \cap \mathcal{L}_2 = \{L_4\}$ in the modified SPL network.

Figure 9:
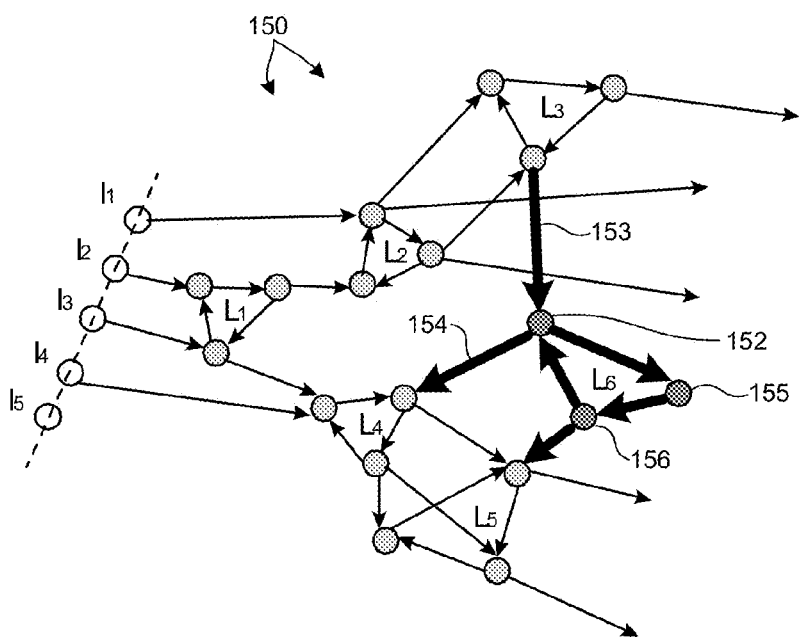
FIG. 9 is a diagram illustrative of a portion 150 of a SPL network in another embodiment.

FIG. 9 is illustrative of a portion 150 of a SPL network another embodiment. In one example, portion is modified by adding nodes and connections. Before modification, the SPL network includes $\mathcal{L}_1 = \{L_1, L_2, L_3\}$ and $\mathcal{L}_2 = \{L_4, L_5\}$ with no node common between $\mathcal{L}_1$ and $\mathcal{L}_2$. From the list of loops $L_1$-$L_3$ and $L_4$-$L_5$, pick any two loops, one from each set. The choice is may be random or more structured (e.g., choose the distance between the pairs to be close enough using a distance method). Once two loops (e.g., $L_3$ and $L_4$) are selected, add a new node 152 geometrically between these two loops. Then create at least two new connections, connection 153 from loop $L_3$ to node 152 and connection 154 from node 152 to loop $L_4$. In this manner, node 152 acts as an intermediate node connecting two existing loops $L_3$ and $L_4$. In this manner, a nonempty intersection of loops (i.e., $\mathcal{L}_1 \cap \mathcal{L}_2 \neq \emptyset$) is guaranteed. After this modification to the SPL network, re-run the SPL network with the training inputs for $A_1, A_2$ and update the list of loops. In the new SPL network, we now have $\mathcal{L}_1 = \{L_1, L_2, L_3, L_4\}$ and $\mathcal{L}_2 = \{L_4, L_5\}$.

A number of other exemplary modifications to an SPL network based on any of adding new nodes and adding new connections may be contemplated to guarantee the objective of nonempty intersection of loops.

In one example illustrated in FIG. 9, multiple connections are added between multiple loops instead of just one connection between only two loops. As depicted in FIG. 9, nodes 152, 155, and 156 are added and connections made among these nodes and loops $L_2, L_4$, and $L_5$. New loop $L_6$ is formed as a result and new loop $L_6$ is connected to loops $L_3, L_4$, and $L_5$. In another example, an entire sub-network is added into an existing network and interconnected with the existing loops.

By adding nodes and adding connections a large set of possibilities exist to satisfy the nonempty intersection property. Specific examples have been presented for exemplary purposes. The aforementioned mechanisms may be performed manually using tools for visualizing the network. They may also be performed automatically by coding these mechanisms as algorithms in a computer.

By satisfying the similarity condition for loop sets associated with images $A_1$ and $A_2$, the SPL network is able to identify a common dynamic loop among images $A_1$ and $A_2$. To guarantee that the SPL network can identify a common dynamic loop among images $A_1$, $A_2$, and $A_3$, the SPL network must be trained such that $\mathcal{L}_1 \cap \mathcal{L}_2 \cap \mathcal{L}_3 \neq \emptyset$. This problem is solved by reducing the 3-image problem ($\mathcal{L}_1$, $\mathcal{L}_2$ and $\mathcal{L}_3$) into the aforementioned 2-image problem ($\mathcal{L}_1$ and $\mathcal{L}_2$). Thus, the SPL network must be modified such that $\mathcal{L} \cap \mathcal{L}_3 \neq \emptyset$. This problem is solved using any of the aforementioned approaches by replacing $\mathcal{L}$ by $\mathcal{L}_1$ and $\mathcal{L}_3$ by $\mathcal{L}_2$.

In this manner, the SPL network is trained for all transformed images $A_1, A_2, \ldots, A_n$ of the training set by iteration. The iterative approach can be generalized to any number of images using mathematical induction as follows. First, the initial condition statement $P_1$ (of mathematical induction), namely, $\mathcal{L}_1 \cap \mathcal{L}_2 \neq \emptyset$ is guaranteed using the above procedure. Assuming the validity of statement $P_k$ (i.e., $\mathcal{L}_1 \cap \mathcal{L}_2 \cap \ldots \cap \mathcal{L}_{k+1} \neq \emptyset$), if we show how to satisfy statement $P_{k+1}$ (i.e., $\mathcal{L}_1 \cap \mathcal{L}_2 \cap \ldots \cap \mathcal{L}_{k+2} \neq \emptyset$) as well, then mathematical induction implies that statement $P_1$ can be satisfied for all n. For this, we first choose $L = \mathcal{L}_1 \cap \mathcal{L}_2 \cap \ldots \cap \mathcal{L}_{k+1} \neq \emptyset$. Now, using the above mechanisms (of adding nodes and/or connections) for the case of two sets of dynamical loops, i.e., for $\mathcal{L}$ and $\mathcal{L}_{k+2}$, we modify the dynamical SPL network to guarantee $\mathcal{L} \cap \mathcal{L}_{k+2} \neq \emptyset$. However, this is just the same as satisfying statement $P_{k+1}$. Therefore, by mathematical induction, we can satisfy $\mathcal{L}_1 \cap \mathcal{L}_2 \cap \ldots \cap \mathcal{L}_n \neq \emptyset$ for any n.

Figure 10:
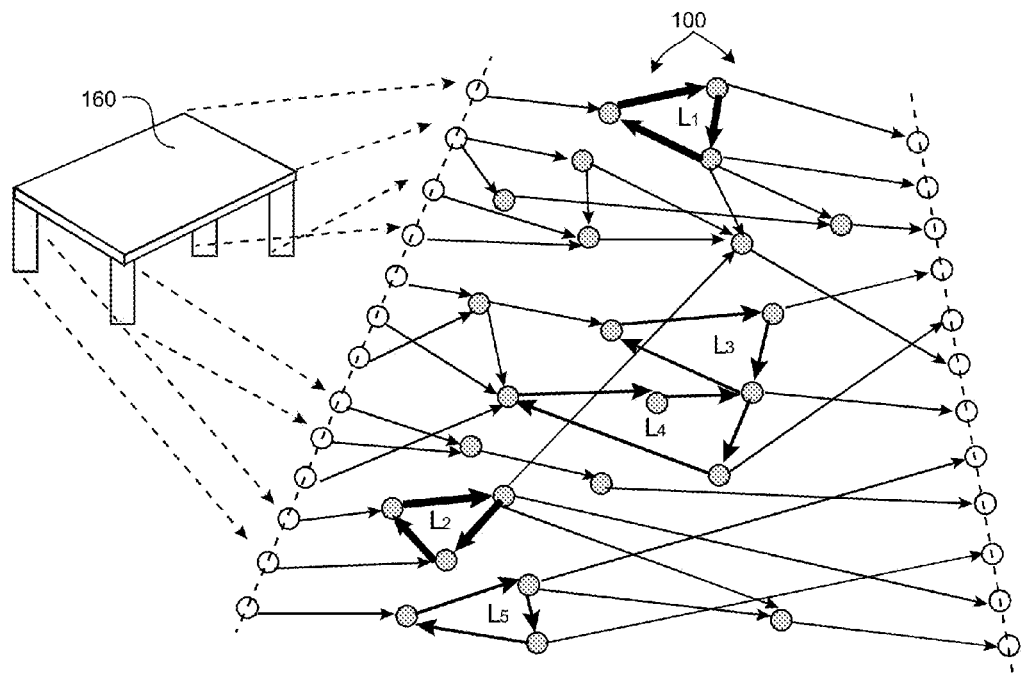
FIG. 10 is a diagram illustrative of a SPL network 100 in one embodiment.

The trained dynamical SPL network has a nonempty collection of dynamical loops common to all variations $A_1, A_2, \ldots, A_n$ of a given image A. This nonempty collection ($\mathcal{L} = \mathcal{L}_1 \cap \mathcal{L}_2 \cap \ldots \cap \mathcal{L}_n \neq \emptyset$) is used as the set of dynamical loops to uniquely identify the image A. For example, as illustrated in FIG. 10, loops $L_1$ and $L_2$ are triggered for every training image associated with a table 160.

The SPL network may be further trained to satisfy the similarity condition for training data associated with a second image B (e.g., images $B_1, B_2, \ldots, B_m$) in the aforementioned manner. For example, as illustrated in FIG. 10, loops $L_1$ and $L_2$ are triggered for every training image associated with a chair 170.

Figure 11:
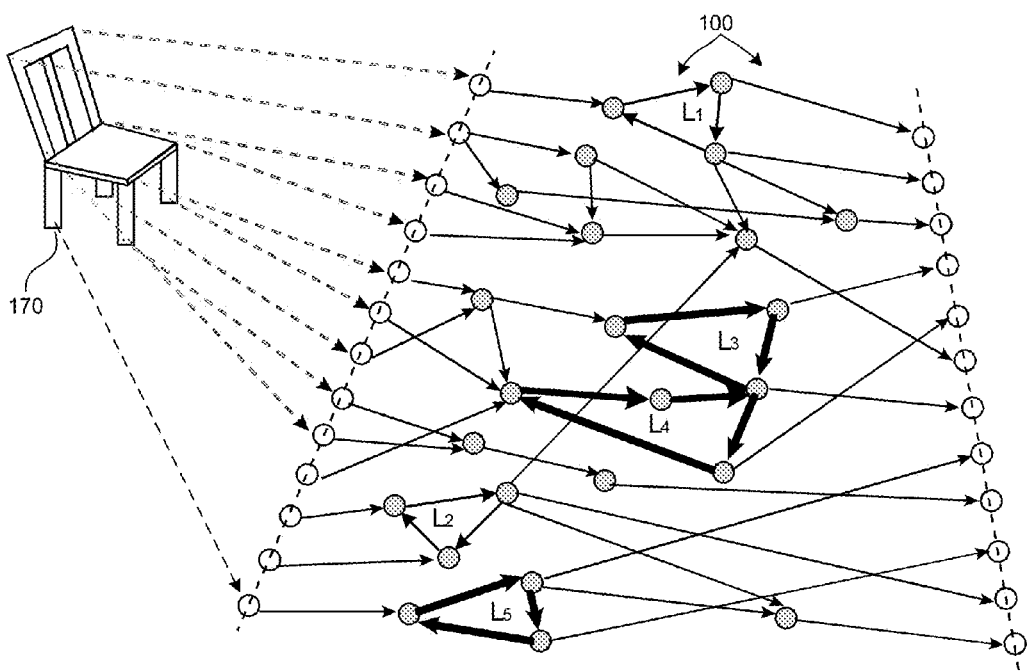
FIG. 11 is a diagram illustrative of a SPL network 100 in another embodiment.

Furthermore, the SPL network may be further trained to satisfy the dissimilarity condition between images A and B to ensure that the trained SPL network can distinguish between images A and B. In geometric terms, a SPL network that is modified to satisfy the dissimilarity condition involves extending the dynamical looped pathways for images A and B in different directions. For example, as illustrated in FIG. 8, the pathways to $L_2$ and $L_3$ branch in a different direction compared to the pathways for $L_4$ and $L_5$ even though both start from loop $L_1$. This is necessary because the input surface is the same for both A and B. Therefore, the initial pathways and the sub-network from the input surface will be the same for both A and B. However, as the similarity condition is satisfied for image A using the above mechanism, we create new loops, say, along the top part of the network. When satisfying the similarity condition for image B, we create new loops on the bottom part of the network. As a result, the modified SPL network will generate two sets of loops for each image. For image A, $\mathcal{L}_A = \mathcal{L} \cap \mathcal{L}_1$ and for image B, $\mathcal{L}_B = \mathcal{L} \cap \mathcal{L}_2$, where $\mathcal{L}$ contains the set of dynamical loops in the common pathways near the input surface and $\mathcal{L}_1$ contains dynamical loops on the top branch while $\mathcal{L}_2$ contains dynamical loops on the bottom branch. Here, $\mathcal{L}_1 \cap \mathcal{L}_2 = \emptyset$. As illustrated in FIG. 8, $\mathcal{L} = \{L_1\}$ and $\mathcal{L}_1 = \{L_2, L_3\}$ and $\mathcal{L}_2 = \{L_4, L_5\}$. Therefore, instead of treating $\mathcal{L}_A$ and $\mathcal{L}_B$, as the set of loops satisfying the similarity condition for images A and B respectively, we regard $\mathcal{L}_1$ and $\mathcal{L}_2$ instead to satisfy the similarity condition. With the new identification of image A and B with $\mathcal{L}_1$ and $\mathcal{L}_2$, we satisfy both the similarity (since $\mathcal{L}_1 \neq \emptyset$ and $\mathcal{L}_2 \neq \emptyset$) and dissimilarity ($\mathcal{L}_1 \cap \mathcal{L}_2 = \emptyset$) conditions. For example, as illustrated in FIGS. 10 and 11, loops $L_1$ and $L_2$ do not share any nodes with loops $L_3$, $L_4$, and $L_5$. In this manner, SPL network 100 is able to distinguish a chair from a table.

This procedure is generalized for any number of distinct images A, B, C, . . . , Z. Although, the trained SPL network includes a common region where distinct images excite the same dynamic loops, this region is typically closer to the input surface. As the pathways extend deeper and farther from the input surface, each image proceeds in a uniquely distinguishable direction. This allows the SPL network to satisfy the dissimilarity condition.

If the dynamical SPL network is modified to satisfy both the similarity and the dissimilarity conditions for all images in the training set, the SPL network is fully trained for the specific training set.

Merging SPL Networks

In addition to training a single SPL network, multiple SPL networks may be merged as part of a training process. If the input surface is the same for two training sets, it may be advantageous to train the same SPL network for both training sets. For example, if the two training sets are both images (e.g., images of human faces and images of geometric shapes), then the input surface is the same in both cases. In this case the same SPL network may be trained for both training sets.

However, if one training set is images of household objects and the other training set is the sounds made by these household objects, then the input surfaces are different (i.e., image and sound input surfaces). In this case it is advantageous to independently train two separate SPL networks, one for the images and the other for the sounds, and then merge them.

Figure 12:
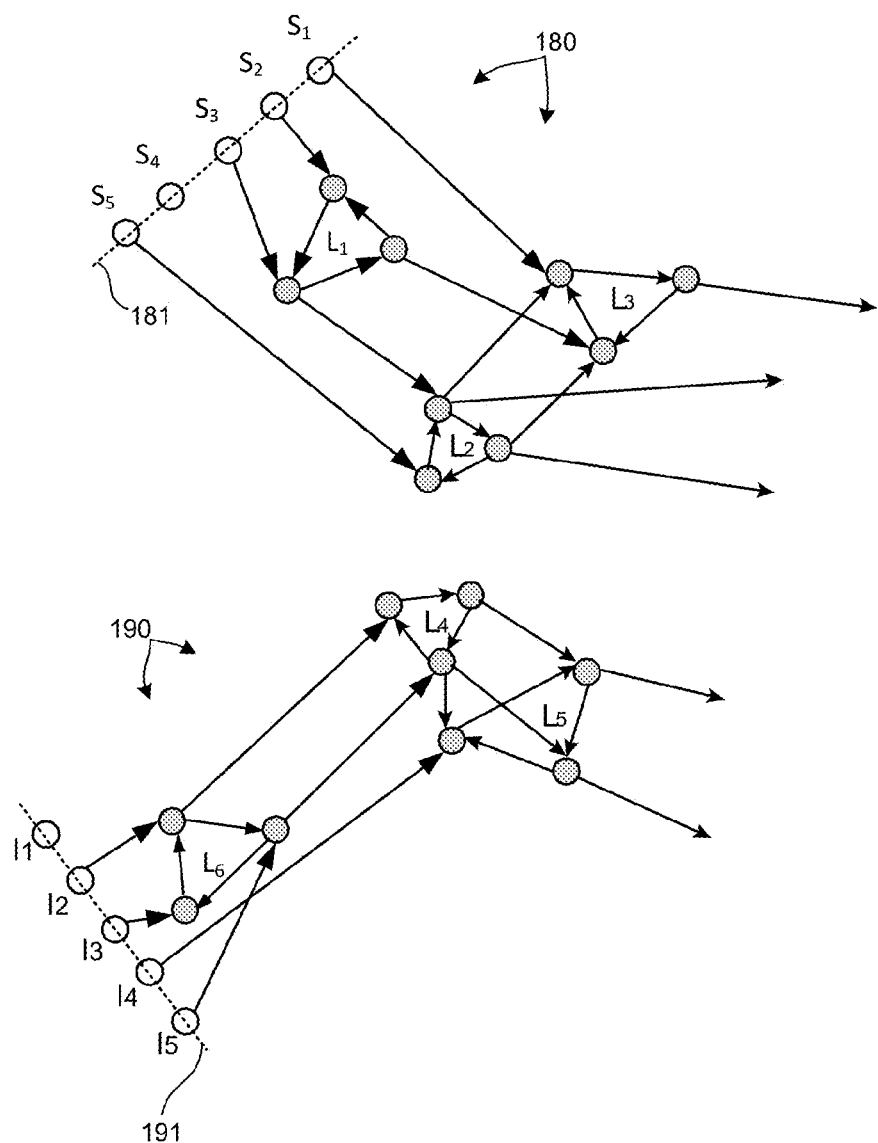
FIG. 12 is a diagram illustrative of two disconnected SPL networks 180 and 190.
Figure 13:
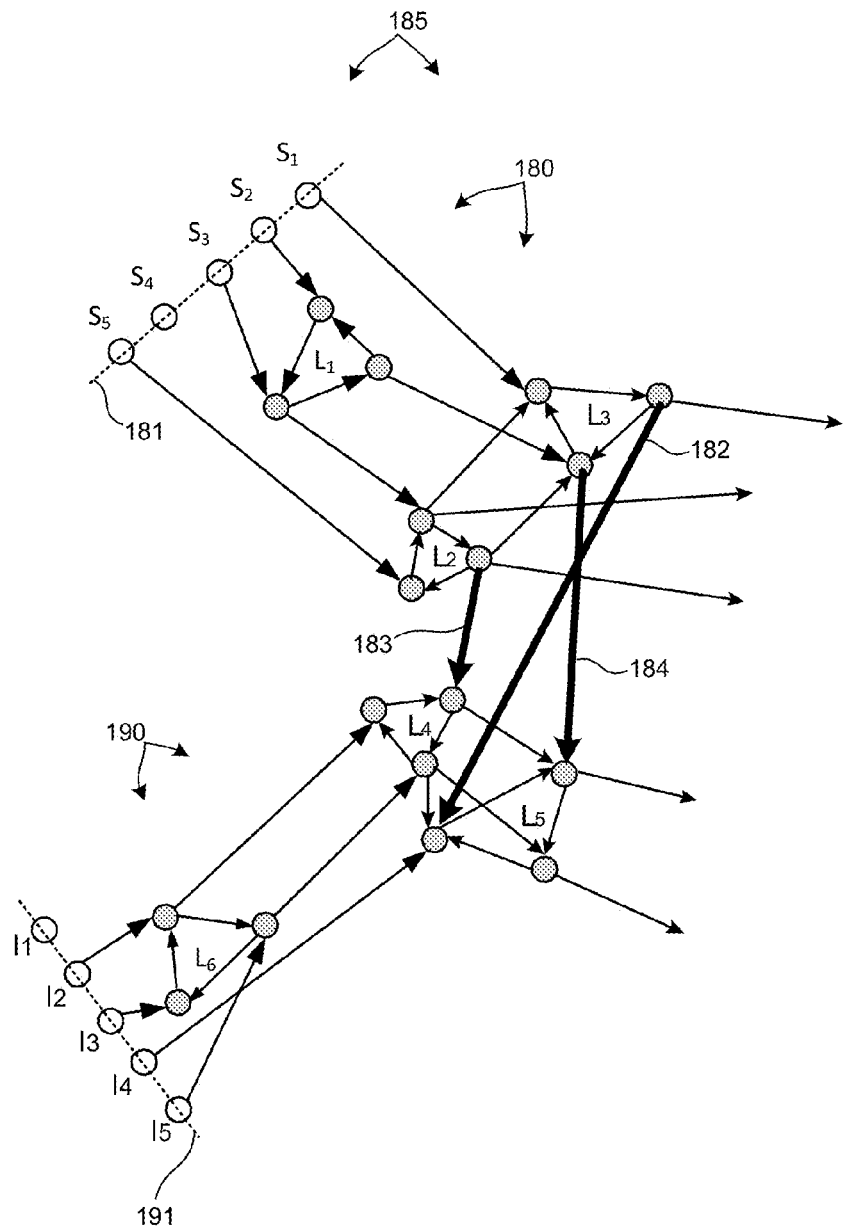
FIG. 13 is a diagram illustrative of two SPL networks 180 and 190 merged into a SPL network 185.

FIG. 12 illustrates two separate SPL networks 180 and 190. SPL network 180 includes an input surface 181 with input nodes $S_1, S_2, \ldots, S_5$. Input surface 181 receives sound signals from the environment. SPL network 190 includes an input surface 191 with input nodes $I_1, I_2, \ldots, I_5$. Input surface 191 receives image signals from the environment. SPL network 180 is independently trained for sound inputs from the environment and SPL network 190 is independently trained for image inputs from the environment.

A properly merged SPL network should satisfy a connectedness condition of dynamical loops excited by simultaneous inputs. For example, a set of dynamical loops $\mathcal{L}_{carimage}$ (e.g., loops $L_4$ and $L_5$) is representative of a car image. Loops $L_4$ and $L_5$ are connected within SPL network 190. A set of dynamical loops $\mathcal{L}_{carsound}$ (e.g., loops $L_2$ and $L_3$) is representative of a car sound. Loops $L_2$ and $L_3$ are connected within SPL network 180. However, in the environment a car image and a car sound are generated simultaneously under most conditions. To capture this reality, a new training set is created with one element representing the simultaneous external inputs of both car image and car sound. Other simultaneous external inputs may also be included in the training set (e.g., ball image and a ball bouncing sound, a fan image and a fan sound, etc.). A merged SPL network fully trained for this new training set should ensure connectivity of the dynamical loops for each element in the training set.

In one embodiment, a connectedness detector tool is employed to merge SPL networks 180 and 190 such that dynamical loops are formed using a training set which contains simultaneous inputs. In a first step the connectedness detector tool lists all of the dynamic loops triggered for a simultaneous input element of the new training set using the loop detector tool. In a second step, the list of detected dynamic loops is compared with the structural network definition of the current network. For example, by traversing the nodes within these detected dynamical loops, a determination is made whether any two sets of dynamic loops within SPL networks 180 and 190 are connected. This determination is made for every pair of loops.

If two or more sets of loops are disconnected, any of a new node and a new connection is added to connect the disconnected dynamic loops of SPL networks 180 and 190. For example, if loops $L_2$ and $L_4$ are simultaneously excited the simultaneous inputs of a car sound on surface 181 and a car image on surface 191, respectively, a new connection 183 is added to connect loops $L_2$ and $L_4$.

This process for merging SPL networks 180 and 190 is repeated for each element in the new training set that contains simultaneous inputs. By way of example, connections 182 and 184 may be added to connect loops of SPL networks 180 and 190. After completion of the training, a merged SPL network 185 ensures that the connectedness condition is satisfied for simultaneous inputs.

The process for merging two SPL networks generalizes to merging of more than two independently trained SPL networks by iteratively choosing a pair of SPL networks at any given instant (say, iteration n). One of the pair is always the merged SPL network from the previous iteration (i.e., merged network n−1 obtained by merging networks 1, 2, . . . , n−1). The other is the next unmerged network (network n) from our list of networks to merge.

Multiple SPL networks may also be merged using external signals from the environment as a natural source of associative inputs to train SPL networks automatically. Using external signals from the environment obviates the need to explicitly create training sets that mimic the real world. Exposure to everyday external inputs like sounds and images automatically provide simultaneous set of inputs to the SPL network. These sources naturally create a disconnectedness situation in the set of dynamical loops triggered. The SPL network is then modified to ensure that the connectedness condition is guaranteed as long as the simultaneous inputs repeat multiple times.

For example, disconnected sets of loops may be monitored by the connectedness detector tool while an SPL network or several unmerged SPL networks interact with the environment. For each pair of disconnected dynamical loops, a count may be incremented each time the pair occurs simultaneously. If this count is greater than a threshold value (e.g., five, ten, or another suitable number), any of a new node and new connection is added to ensure that the connectedness condition is satisfied for this pair of dynamical loops. In other words, the connectedness condition is not enforced when two inputs occur simultaneously just once or a small number of times. This captures the learning notion that if an event repeats several times, we memorize it eventually. In this manner, the dynamical SPL network is exercising self-learning behavior rather than learning through specific training.

By capturing the external environment within a SPL network automatically, a SPL network acquires knowledge about the environment without human intervention. For example, a human is not needed to teach that a car image and car sound should go together or that the word 'car' and an image car should be associated, etc. In this manner associative inputs that exist in the environment are automatically mapped into the SPL network. A result of these associative links between dynamical loops is that triggering dynamic loops corresponding to a car sound will automatically trigger car image loops and not a ball image loops. This captures the learned behavior of thinking about an image of a car when hearing a car sound.

Exemplary Embodiments

FIG. 14 is a diagram illustrative of a stable parallel loop system 300 that includes a general purpose computer 140 operable to implement tools useful to develop and implement a SPL network 100. Computer 140 includes a processor 141 and a memory 142. Processor 141 and memory 142 may communicate over bus 143. Memory 142 includes an amount of memory 144 that stores a program code that, when executed by processor 141, causes processor 141 to run a SPL network by operation of SPL network implementation tool 146. Memory 142 also include an amount of memory 145 that stores a program code that, when executed by processor 141, causes processor 141 to implement SPL network development functionality by operation of SPL network development tool 147. Memory 142 also includes an amount of memory 148 that stores a SPL network 100.

SPL system 300 may include input transducers (not shown) that capture external signals from the environment. SPL system 300 may also include output transducers (not shown) that generate external signals that affect the environment. In addition SPL system 300 may include peripheral devices useful to accept inputs from an operator (e.g., keyboard, mouse, etc.) and display outputs to the operator (e.g., display monitor).

SPL network development tool 147 performs several tasks that facilitate the development of a SPL network 100. In one example, SPL network development tool 147 renders a visual representation of a SPL network 100. For example, FIG. 2 illustrates a graph representation of a SPL network 100 that may be rendered by SPL network development tool 147. The nodes, input and output connections, and input and output surfaces are represented visually. The tool 147 captures the geometric layout of the nodes and the graph. This information is encoded within a Node class (e.g., node class 205 illustrated in FIG. 15). SPL network development tool 147 maintains a list of neighboring nodes for each given node. The neighboring nodes may or may not be connected to the current node. The neighboring nodes provide proximity information that may be used when modifying the network. For example, when adding a new connection from one set of nodes to another set, proximity information may be used to determine the closest pair of nodes to make the new connection.

In another example, SPL network development tool 147 is used to modify the SPL network structure. For example, SPL network development tool 147 adds new nodes and new connections, modifies existing connections, and deletes nodes and connections.

In another example, SPL network development tool 147 is used to monitor the flow of data within SPL network 100. In one example, SPL network development tool 147 monitors the activity of each node in terms of quantity and rate of inputData received, the quantity and rate of outputData sent, periods when a node is active, periods when a node is idle, periods when there is inputSaturation and/or outputSaturation, the rate of decay of inputs and outputs, input and output delays, etc. SPL network development tool 147 may render the flow of data visually in real time. In another example, SPL network development tool 147 may store the flow of data in a memory (e.g., memory 142) and replay the flow of data at a later time.

In another example, SPL network development tool 147 is used to render a dynamic loop to quickly identify a collection of loops triggered in response to a given external input. Visually detected loops facilitate estimating the distance between loops and identifying the closest nodes between two such loops. This is useful when making a decision to add a new connection or link between two such loops.

In another example, SPL network development tool 147 is used to serialize graph information associated with a SPL network 100 onto a database, a text file or an XML file and stored in memory 148. Each node ID and the set of its input node ID's and output node ID's could be stored as a row in a database, in a line on a text file, in a tagged XML format, JSON format or any other suitable format. Any of these serialization procedures could be used later to reconstruct the graph structure as instances of classes. Serialization onto memory 148 allows the SPL network to be shut down and rebuilt to the same state at a later time. This is useful when developing a dynamical SPL network. For example, after training a dynamical SPL network, the trained state may be stored in an amount of memory 148 illustrated in FIG. 14. By recording the trained SPL network, the dynamical SPL network can be rebuilt directly instead of retraining a random initial network.

In another example, SPL network development tool 147 is used to generate a set of subclasses of nodes and their corresponding input-output maps from a visual representation of a SPL network 100. This information is useable by SPL network implementation tool 146 to run the SPL network 100.

Figure 15:
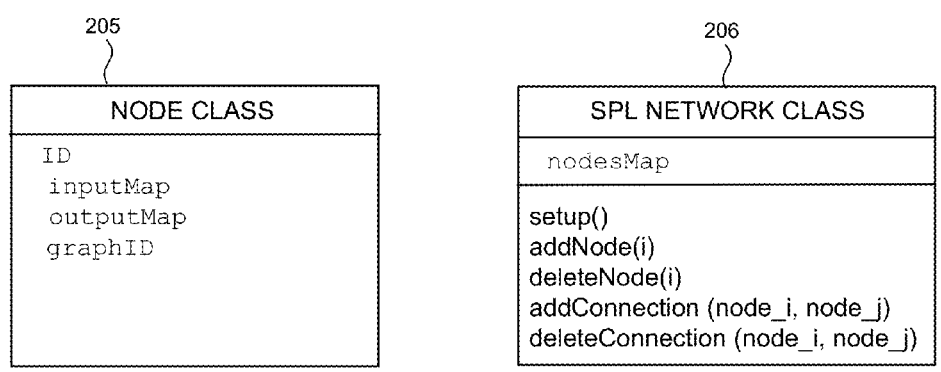
FIG. 15 is a diagram illustrative of an exemplary node class 205 and a SPL network class 206.
Figure 16:
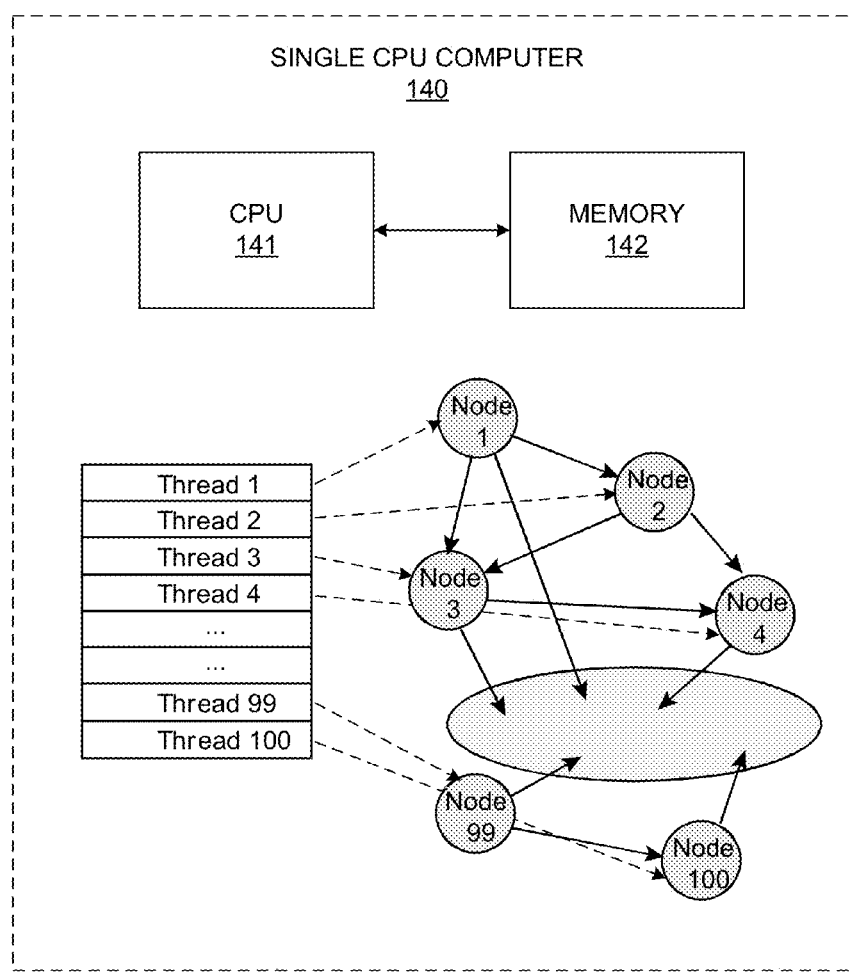
FIG. 16 is a diagram illustrative of a stable parallel loop system 300 in another embodiment that is operable to implement tools useful to develop and implement a SPL network 100.

By way of example, FIG. 15 illustrates two basic classes that may be generated by SPL network development tool 147 to realize a SPL network 100. Node class 205 has a many-to-many relationship to itself. Each node (node$_i$) in the SPL network has an ID (i, in this case, where i=1, 2, . . . , N). It is represented by the same base class containing two maps, one to store the collection of input connections (inputMap) and the other to store output connections (outputMap). The inputMap contains node$_{ij}$ where index i references the node$_i$ and j=1, 2, . . . , I$_i$. Here I$_i$ are the total number of input nodes for node$_i$. The outputMap contains node$_{ij}$ where index i references the node$_i$ and j=1, 2, . . . , O$_i$. Here, O$_i$ are the total number of output nodes for node$_i$.

SPL network class 206 includes tools to debug, config, visualize, and design structural networks. For example, addConnection(node$_i$, node$_j$) adds an node$_j$ into the outputMap of node$_i$ and adds node$_i$ to the inputMap of node$_j$. Similarly, deleteConnection(node$_i$, node$_j$)) removes node$_j$ from the outputMap of node$_i$ and removes node$_i$ from the inputMap of node$_j$. Every connection is between a source node (node$_i$) and a destination node (node$_j$) as indicated by the arguments in the methods above. The structural network may be altered in any manner using the aforementioned tools. In another example, addNode(i) may be used to add a node and deleteNode(i) may be used to delete an existing node from the current network of nodes.

SPL network implementation tool 146 causes processor 141 to run a SPL network. In one embodiment illustrated in FIG. 16, SPL network implementation tool 146 is used to create a thread pool manager which instantiates as many threads as there are nodes in the structural SPL network generated by SPL network development tool 147. Each thread takes a runnable object associated with each node object. The runnable object includes a run method that specifies what the thread does when it is in a start state. The run method in the node is an infinite loop that keeps processing inputData and outputs data as described with respect to FIG. 4. To run the SPL network 100, SPL network implementation tool 146 starts all the threads by calling their start methods and each node runs in its own thread in a single CPU computer.

Figure 17:
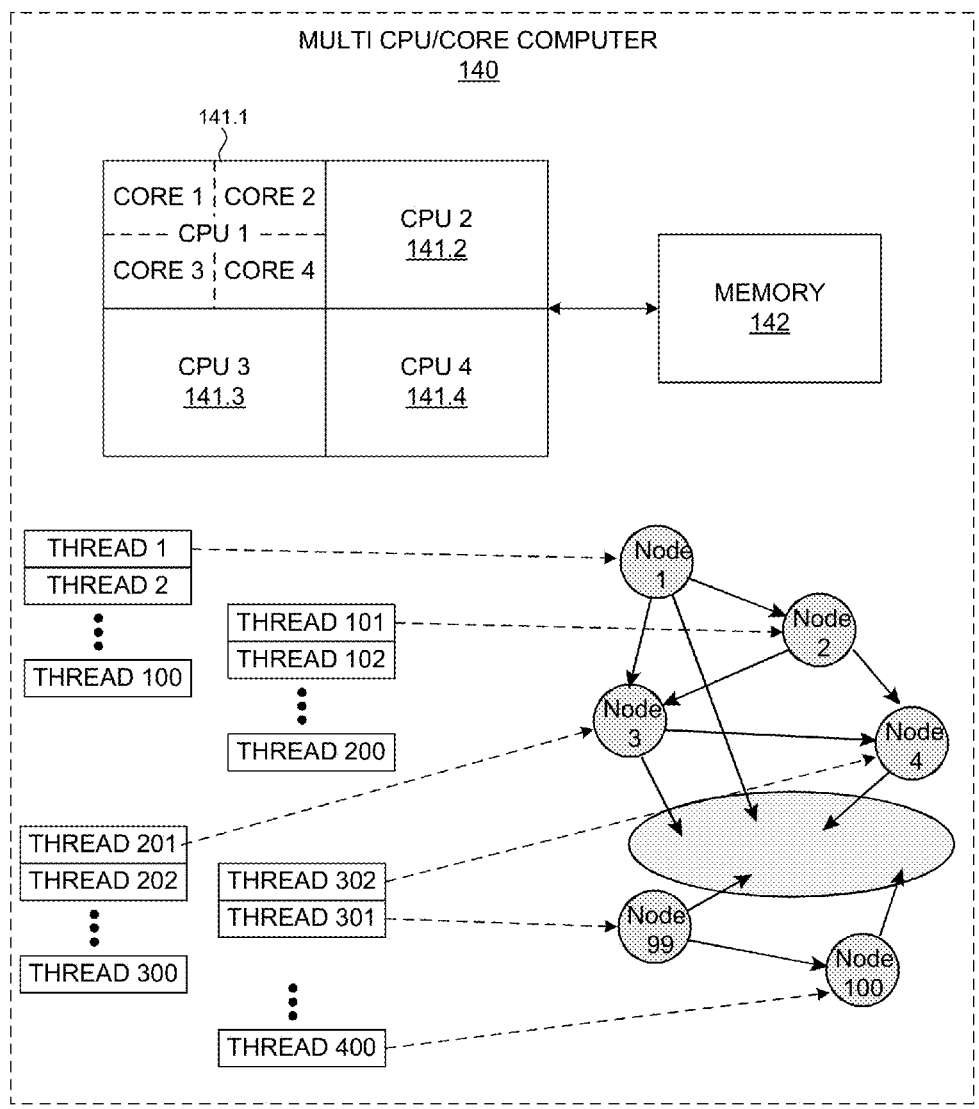
FIG. 17 is a diagram illustrative of a stable parallel loop system 300 in another embodiment that is operable to implement tools useful to develop and implement a SPL network 100.

In another embodiment illustrated in FIG. 17, computer 140 is a computer with multiple cores, multiple CPUs, or both multiple cores and multiple CPUs. In one example SPL network implementation tool 146 is used to assign each node to run on its own CPU or core. In another example, SPL network implementation tool 146 instantiates hundreds of threads for each CPU. Each node then runs on one thread on a specific CPU. The data communication between threads or processes as well as between different CPUs is managed using the API's provided by the operating system. In some situations, the hardware layer at individual CPU's or cores allow a direct access to each CPU's state (like the descriptor tables for individual thread switching and the processor state registers). Accessing directly via the hardware layer offers better speed and performance advantages over accessing through the operating system.

Figure 18:
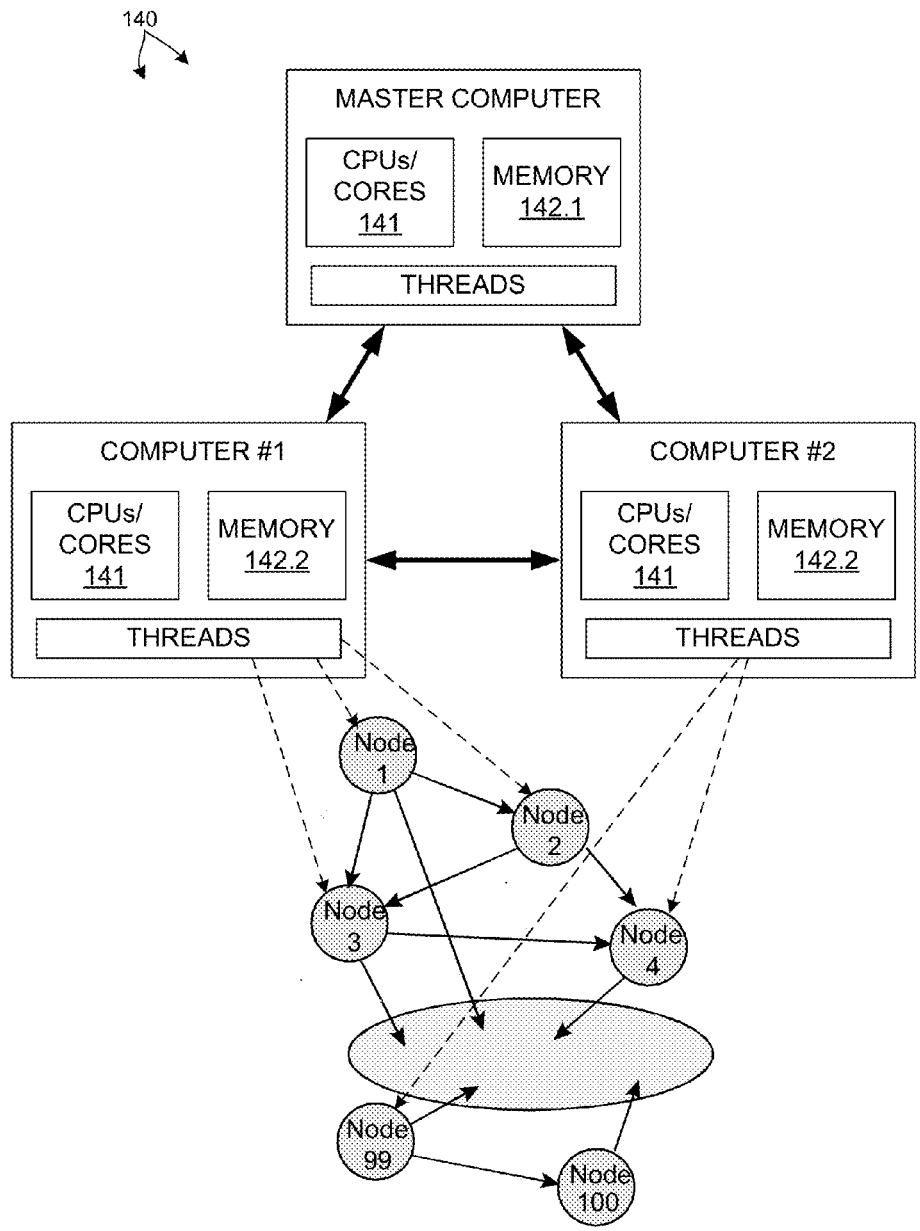
FIG. 18 is a diagram illustrative of a stable parallel loop system 300 in another embodiment that is operable to implement tools useful to develop and implement a SPL network 100.

In another embodiment illustrated in FIG. 18, computer 140 is a system of distributed computers, each with one or more CPU's. The communication protocol, in this case, between computers can be any of HTTP, HTTPS, RPC, transmitting data through socket connections, XML based, web services and other technologies. The basic architecture for creating nodes and managing the states of each node through a central computer offers redundancy.

Figure 19:
FIG. 19 is a diagram illustrative of a SPL network engine 400 in one embodiment that is operable to implement tools useful to develop and implement a SPL network 100.

In another embodiment illustrated in FIG. 19, a SPL network engine 400 runs the SPL network 100 in the manner discussed with reference to SPL network implementation tool 146. SPL network engine 400 implements the SPL network on specialized electronic hardware. One embodiment of SPL network engine 400 is a specialized microchip designed using a well known approach to convert an algorithm to a hardware microchip (e.g., a microchip designed by Algotochip Corporation).

In another embodiment (not shown), a network of SPL network engines 400 may be implemented, one SPL network engine 400 for each node of SPL network 100. Static network information is stored within routers connecting one node engine to another. Even though physical connections exist between any one node chip to any another node chip via a router, the router only allows specific connections as specified in its internal memory. The inputData that will be passed from a source node chip to a destination node chip will store the destination node chip ID at all times. The router then knows where to direct the data.

A person skilled in the art realizes other parallel architectures like a star layout, grid layout, cluster layout, ring layout, tree layout, a hypercube layout and other topologies can be used to store the inputMap and outputMap information that allows specific connections from a given node to another one. The examples mentioned here are to be used as a guide to implement the basic SPL network architecture.

A running SPL network processes input data that flows into SPL network 100 from input nodes 101. Typically, input nodes 101 are input transducers that convert an external, physical signal into a digital signal useable by the SPL network. Exemplary input transducers include temperature sensors, chemical sensors, image sensors, sounds sensors, and touch sensors.

Figure 20:
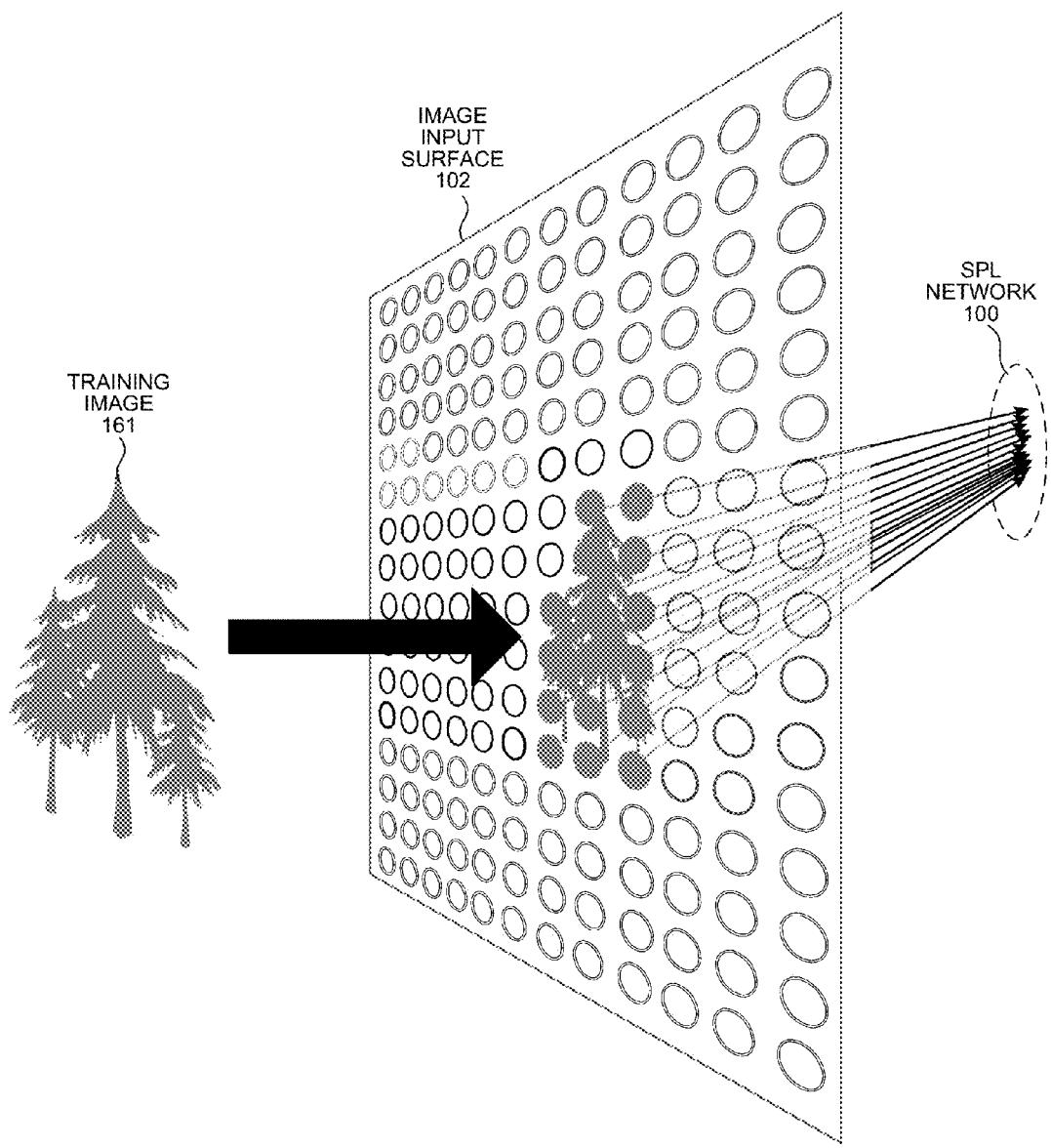
FIG. 20 is a diagram illustrative of an image input surface 102 that generates input for the SPL network 100.

FIG. 20 illustrates an array of image input transducers that generate input for the SPL network 100. Each input transducer translates light information from an image into a digital signal. As depicted, training image 161 is a one hundred by one hundred pixel image of a tree. Image input surface 102 includes a one hundred by one hundred grid of input nodes. In this example, the input nodes map one-to-one to the pixels of training image 161. Each pixel has color information unique to training image 161. For example, pixels associated with the background are treated as having no color information (i.e., zero values for inputData) while pixels associated with the foreground include numerical values representative of a color coordinate of that pixel. The image information associated with each pixel is communicated to each corresponding input node and the inputData associated with each input node is updated with this image information. In one example, the data is sent as bursts of values with a sampling frequency that is many times (e.g., 10-1000 times) the rate of decay of a non-looped pathway of a tuned SPL network 100. This results in a flow of inputData into the SPL network 100 through those input nodes that correspond with pixels having image information. If the image is a car, a different set of input nodes receive inputData.

Threads corresponding to active input nodes process the inputData and generate outgoing signals communicated to other internal nodes via corresponding output connections. In this manner, the inputData propagates from one node to the next making the nodes active along the path. The flow propagates deeper into the network as long as the training image 161 continues to remain on the input surface 102. As a result, some portions of the SPL network become active while others remain idle. When training image 161 is removed from input surface 102 the dynamical loops within the SPL network 100 persist. In this manner, the dynamical loops may be used to identify training image 161 as discussed herein. Eventually, after training image 161 is removed, the entire SPL network 100 returns to an idle state.

In another example an input surface 102 is a sound input surface. An exemplary sound input surface includes input nodes corresponding to particular frequencies within a range of frequencies of interest. For example, a sound input surface may include an input node associated with each frequency within the human audible sound frequency range of 20 Hz to 20,000 Hz (e.g., one node associated with 20 Hz, another node associate with 21 Hz, etc.). A sound (e.g., a ball bouncing for ten seconds) may be decomposed into its frequency components by any well known method and the resulting values are associated with the corresponding input nodes of the sound input surface. The resulting inputData flows into the SPL network as discussed above with respect to FIG. 20. In this manner, the resulting dynamic loops may be used to identify the sound.

In another example an input surface 102 is a multi-touch input surface (e.g., touch screen). An exemplary touch input surface includes input nodes corresponding to each distinct location within the multi-touch surface. Each input node receives a binary value indicating whether the touch screen is being touched. If the touch screen surfaces are capable of sensing the intensity of touch, the node corresponding to each location receives an intensity value. As a pattern is generated on the touch screen by a sequence of touches, the flow of intensity information is sent to the corresponding nodes of the input surface. This is the source of inputData to the input nodes that flows into the SPL network as discussed with respect to FIG. 20. In this manner, the resulting dynamic loops may be used to identify the touch sequences.

SPL Network Applications

SPL networks have several applications that exhibit self-learning behavior. Applications of SPL networks to image and sound recognition and the association of images to sounds are discussed hereinbefore. These descriptions focused on mechanisms to modify SPL networks while enforcing specific conditions (e.g., similarity, dissimilarity and connectedness). Several applications are presented hereinafter to further illustrate problems solved using SPL networks.

Figure 21:
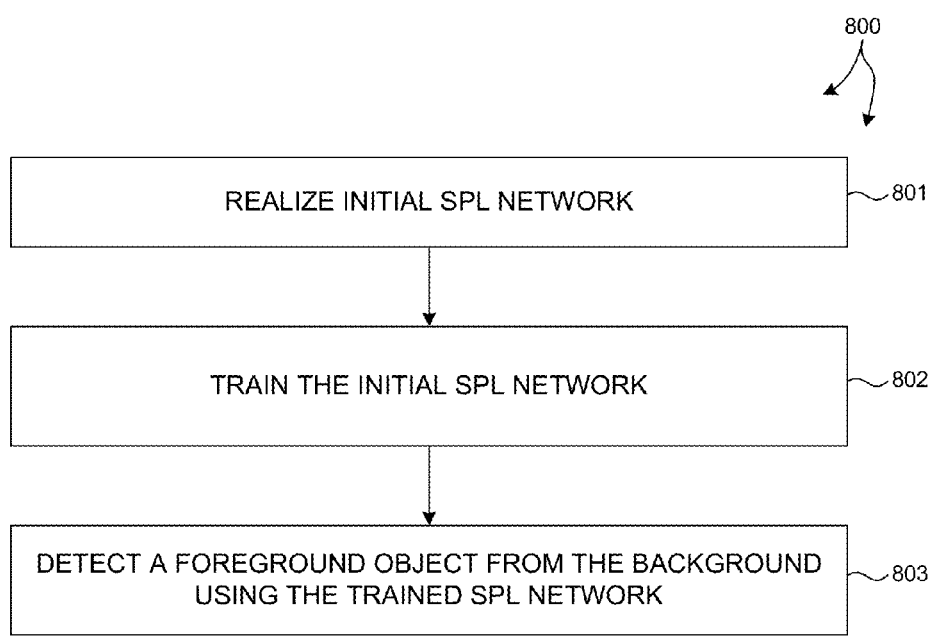
FIG. 21 is illustrative of a method 800 of distinguishing a foreground object using a SPL network.

FIG. 21 is illustrative of a method 800 of distinguishing a foreground object from the background using an SPL network as described herein. At block 801, an initial SPL network is realized with node parameters tuned to avoid a fully active network as described herein. At block 802, the initial SPL network is trained using training sets of images (e.g., tables, chairs and others). The initial SPL network should be trained to satisfy the similarity and the dissimilarity conditions for each image from your specific training set $\mathcal{T} = \{A_1, A_2, \ldots, A_n\}$, where $A_i$ are distinct images for i=1, 2, n. Let the set of dynamical loops triggered by the trained SPL network be $\mathcal{L}_1, \mathcal{L}_2, \ldots, \mathcal{L}_n$ for each respective image $A_1, A_2, \ldots, A_n$. During the training phase, each image is individually presented onto the input surface. It also falls within a specific region R. If a new image falls within this region, the trained SPL network would be able to recognize and compare the set of dynamical loops $\mathcal{L}$ presently triggered, with the corresponding ones for the images from the training set. However, if the new image falls partially or completely outside this region, the set of dynamical loops $\mathcal{L}$ triggered should not be compared with $\{\mathcal{L}_1, \mathcal{L}_2, \ldots, \mathcal{L}_n\}$. Therefore, we need to move and transform the image so it centers within the region R.

Several approaches can be used to move and transform the image. The most common ones, in which we do not factor the specific characteristics of the image, are random motions and choosing specific curved paths to move and transform the image along. Other approaches use the characteristics of the image itself. For example, we can trace along an edge that exists within the image. Another example is to trace across contrasting colors (after the SPL network is trained to detect contrasting colors).

At block 803, the trained SPL network is used to detect a foreground object from the background. The foreground object can be detected from the background as follows.

Compute the cardinality for each of the sets $\mathcal{L} \cap \mathcal{L}_i$ for i=1, 2, ..., n as the image moves and transforms according to any of the approaches specified in block 802. Somewhere along the path, the cardinality of $\mathcal{L} \cap \mathcal{L}_i$ is maximum for each i=1, 2, ..., n. This maximal location along the path is typically different for each image $A_1, A_2, \ldots, A_n$. If the maximal cardinality of $\mathcal{L} \cap \mathcal{L}_i$ when using a given image $A_i$ is zero, then the new image under consideration is not similar to $A_i$. On the other hand, if, at any given time, the moved/transformed image falls within the region R and is similar to one of the image $A_i$ in the training set, then it is guaranteed that $\mathcal{L} \cap \mathcal{L}_i$ is maximal. This follows directly from the similarity condition for the trained SPL network. Compute the maximum value of the maximal cardinality for each i=1, 2, ..., n. If this maximum value is zero, then the new image is not within the training set. In this case, we treat the image as the background. If the maximum value is not zero, then the new image is a foreground object. To identify this object within the training set, we use the value of i for which the maximum value is attained. The corresponding image Ai is the similar image from the training set. The location along the path and the corresponding transformation also can be identified for which the cardinality of $\mathcal{L} \cap \mathcal{L}_i$ was maximum.

In this manner, a foreground object is distinguished from a background by moving and transforming the object around and comparing it with the training set.

In this manner a new image is refocused onto region R even if it was initially at a different location. This is analogous to turning our head or eyes to refocus an image to fall on the fovea of our retina.

This algorithm is especially useful for the general image recognition problem for a new image with multiple different objects in it. We would be able to detect each object within the image, one-at-a-time, analogous to how we scan different objects in the image one-at-a-time to recognize all of them eventually.

Figure 22:
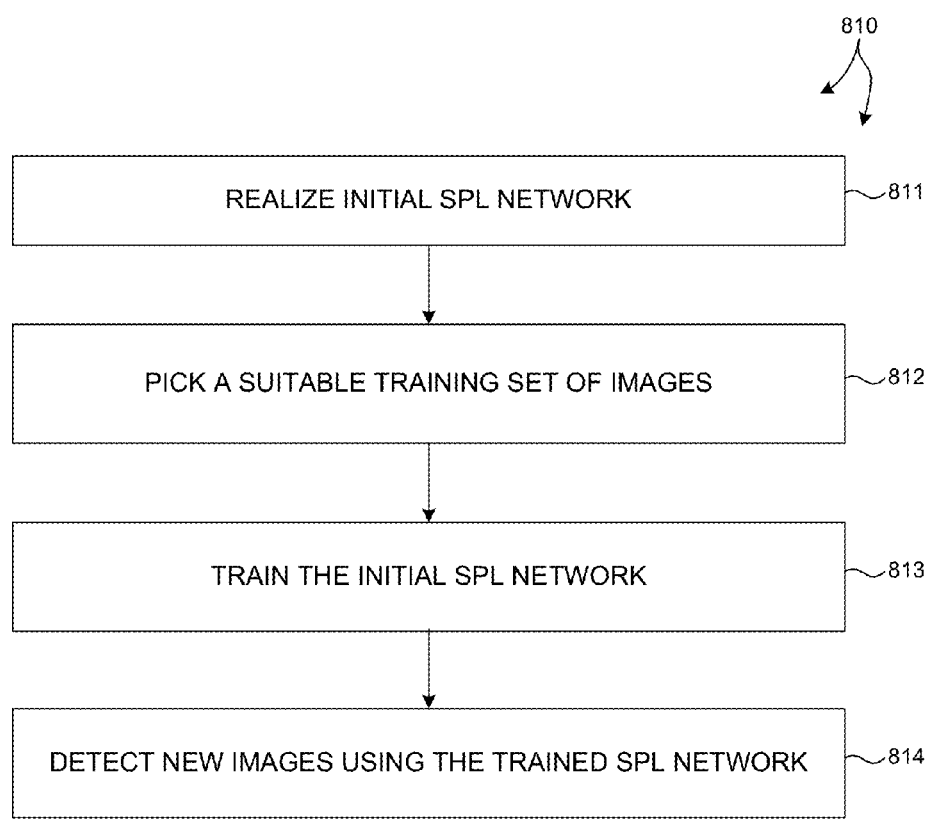
FIG. 22 is illustrative of a method 810 of image recognition using an SPL network.

FIG. 22 is illustrative of a method 810 of image recognition using an SPL network as described herein. Given an image including several objects, a trained SPL network is solves the image recognition problem if it is capable of correctly identifying each of the objects in the image. Since a SPL network is a learning system, it may not recognize all the objects correctly from a random image right away. However, as it is subjected to different training inputs or everyday external inputs and as is continuously modified in compliance with the similarity and dissimilarity conditions, the SPL network recognizes the objects accurately.

At block 811, an initial SPL network is realized with node parameters tuned to avoid a fully active network as described herein.

At block 812, pick a suitable training set of images that we want our SPL network to recognize. For example, if we want to recognize everyday household objects, then we pick a training set of such images. If we want to recognize human faces, the training set will include a collection of human faces. Other exemplary training sets may include geometric shapes, different handwritten text, different symbols in a language (e.g., Cantonese, Russian, etc.), different mathematical symbols, different components of a car, different electronic circuit symbols, sheet music symbols, etc.

At block 813, train the initial SPL network to satisfy the similarity and the dissimilarity conditions for each image from the specific training set $\mathcal{T} = \{A_1, A_2, \ldots, A_n\}$, where $A_i$ are distinct images for $i=1, 2, \ldots, n$. For example, FIGS. 10 and 11 select common household images as an example of the training set for purposes of illustration.

The trained SPL network includes a set of dynamic loops $\mathcal{L}_1, \mathcal{L}_2, \ldots, \mathcal{L}_n$ for each image $A_1, A_2, \ldots, A_n$ respectively. They are guaranteed to satisfy the similarity condition ($\mathcal{L}_1 \neq \emptyset$, $\mathcal{L}_2 \neq \emptyset, \ldots, \mathcal{L}_n \neq \emptyset$) and the dissimilarity condition ($\mathcal{L}_i \cap \mathcal{L}_j = \emptyset$) for all $i \neq j$ and $i, j = 1, 2, \ldots, n$. Each image $A_i$ has a set of $m_i$ dynamical transformations $j = 1, 2, \ldots, m_i$. Each of the $m_i$ transformed images $A_{ij}$ are considered as similar to the original image $A_i$. Each transformed image $A_{ij}$ for a given image $A_i$ has a set of dynamical loops $\mathcal{L}_{ij}$, where $j=1, 2, \ldots, m_i$. $\mathcal{L}_{ij} \neq \emptyset$ for $j=1, 2, \ldots, m_i$ and $i=1, 2, \ldots, n$ based on satisfaction of the dissimilarity condition. Note that there are a total of $m_1 + m_2 + \ldots + m_n$ nonempty conditions. $\mathcal{L}_{i1} \cap \mathcal{L}_{i2} \cap \ldots \cap \mathcal{L}_{imi} \neq \emptyset$ for $i=1, 2, \ldots, n$ based on the similarity condition for each of the images $A_1, A_2, \ldots, A_n$.

A trained SPL network that satisfies the aforementioned conditions implies that (a) any two images in the training set are distinguishable from each other using the corresponding set of dynamical loops and (b) slight dynamical variations or transformations to each image are recognized as the same image. In the example of FIGS. 10-11, this implies that a table and a chair are distinguished as based on the set of dynamical loops triggered. Specifically, dynamical loops $L_1$ and $L_2$ are used to identify a table while dynamical loops $L_3$, $L_4$ and $L_5$ are used to identify a chair. In addition, a translated, rotated or zoomed table produces the same set of dynamical loops.

At block 814, when presented with a new input image, the trained SPL network recognizes two or more objects that look similar to the ones from the training set.

When the new input image falls on the input surface of the trained SPL network, the following steps occur for image recognition. The set of foreground objects are identified and distinguished from background objects, as detailed with reference to method 800. In one example, the SPL network identifies foreground images that correspond to a table and two chairs. If a sofa, present in the image, is not part of the training set, the SPL network is not capable of identifying it as a foreground object. It just treats it as a background object. The SPL network identifies the existence of foreground objects $O_1$, $O_2$ and $O_3$. The objective of the image recognition problem is to identify object $O_1$ as a table and objects $O_2$ and $O_3$ as chairs. The dissimilarity condition satisfied for the SPL network for objects $O_1$ and $O_2$ (as well as object $O_1$ and $O_3$) implies that both objects generate disjoint sets of dynamical loops. This is verified by using the loop detector tool to identify the set of dynamical loops for each of the three foreground objects $O_1$-$O_3$ (e.g., $\mathcal{L}_a$, $\mathcal{L}_b$, and $\mathcal{L}_c$, respectively). A simple set comparison implies that the objects $O_1 \neq O_2$, objects $O_1 \neq O_3$ and objects $O_2 = O_3$. Thus, two objects ($O_2$ and $O_3$) are the same and both of these are distinct from the third object ($O_1$). The similarity condition is used to identify and associate each of these objects $O_1$-$O_3$ to corresponding objects from the training set. Thus, we compare $\mathcal{L}_a$ with the corresponding sets of loops for the objects already trained from the training set (i.e., $\{\mathcal{L}_1, \mathcal{L}_2, \ldots, \mathcal{L}_n\}$). The set comparison shows that $\mathcal{L}_a$ is equal to $\mathcal{L}_i$ for some $i \in \{1, 2, \ldots, n\}$. In the more general case, $\mathcal{L}_a$ may not be identical to $\mathcal{L}_i$. Rather, $\mathcal{L}_a \cap \mathcal{L}_i$ will be a maximal nonempty set for some $i \in \{1, 2, \ldots, n\}$. The maximality can be computed in any number of ways. The simplest approach is to find the largest value for the total number of elements in the set. Therefore, we identify $\mathcal{L}_a$ with $\mathcal{L}_i$, $\mathcal{L}_b$ with $\mathcal{L}_j$ and $\mathcal{L}_c$ with $\mathcal{L}_k$ for some $i, j, k \in \{1, 2, \ldots, n\}$. Since each of $\{\mathcal{L}_1, \mathcal{L}_2, \ldots, \mathcal{L}_n\}$ from the training set is already identified with a real physical object like tables, chairs and others, we now know that $\mathcal{L}_a$, $\mathcal{L}_b$ and $\mathcal{L}_c$ (i.e., $\mathcal{L}_i$, $\mathcal{L}_j$ and $L_k$, respectively) are a table and two chairs respectively.

In this manner, the SPL network solves the image recognition problem. Generally, a SPL network may be trained with more than one training set, thus enabling the solution of complex image recognition problems.

As the SPL network is fully trained with multiple training sets, the total number of nodes and interconnections increases. However, several of the nodes generate outputData quickly because they have received inputData and this value is already beyond the threshold value. There is no need for these nodes to wait until the sufficient inputData is received. If the complexity of the SPL network is higher, the number of input connections for a given node is higher as well. As a result, a given node can quickly exceed the threshold value and hence cause faster propagation of inputData and outputData within the SPL network. Therefore, speed of image recognition is maintained.

In addition, the solution accuracy increases with the complexity of SPL network because we can ensure that (a) the set of dynamical loops are distinct for a large number of distinct images, thereby making it easy to recognize a large number of objects in a new image and (b) the set of dynamical loops have nonempty intersection for a large set of dynamical transformations of images, thereby making it easy to recognize the same image even under unexpected and complex but realistic variations.

Figure 23:
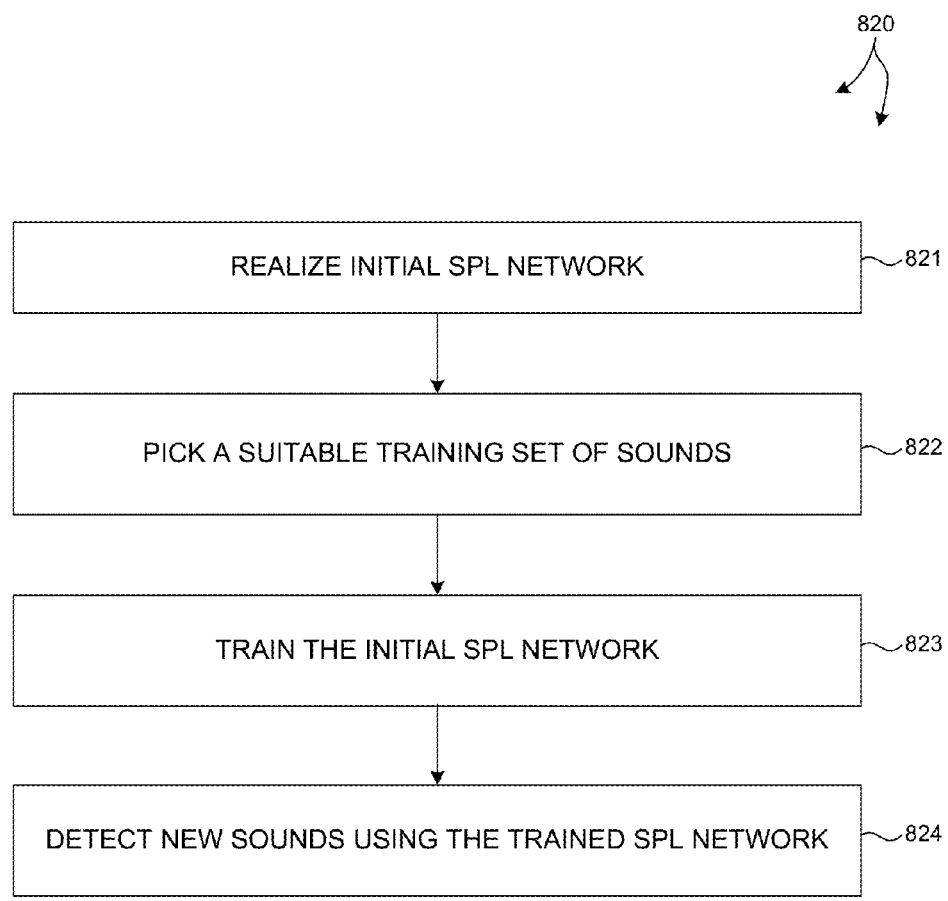
FIG. 23 is illustrative of a method 820 of sound and speech recognition using an SPL network.

FIG. 23 is illustrative of a method 820 of sound and speech recognition using an SPL network as described herein. The problem of sound and speech recognition within the framework of SPL network is almost identical to the image recognition algorithm discussed with reference to method 810.

At block 821, an initial SPL network is realized with node parameters tuned to avoid a fully active network as described herein.

At block 822, pick a suitable training set of sounds or speech that we want our SPL network to recognize. Some common examples of such training sets are sounds of words in a language (including from several different languages) and sounds of objects.

At block 823, train the initial SPL network to satisfy the similarity and the dissimilarity conditions for each sound from your specific training set={A1, A2, ..., An}, where Ai are distinct images for i=1, 2, ..., n. The input surface for sound was described previously. As with image training sets, we could use multiple sound/speech training sets and train different specialized SPL networks. Each element from the training set would have distinguishable set of dynamical loops by following steps analogous to those described in block 813. This is the dissimilarity condition applied to sounds in the training set. The similarity condition is also satisfied for sounds using different accents and voices (e.g., differences in male, female and children voices) as the dynamical transformations, instead of geometric transformations such as translations and rotations used for images. The steps are analogous to those described in block 813.

At block 824, the trained SPL network recognizes two or more sounds/speech terms that sound similar to the ones from the training set when presented using a new input sound pattern. The steps are analogous to those described in block 814 in which we satisfy the similarity and dissimilarity conditions. For example, the trained SPL network first identifies that there are different words in a sentence based on the dissimilarity condition (i.e., each word produces different and distinct set of dynamical loops). Next, to identify each word individually, we use similarity condition. Each word is mapped to a specific word from the training set using a maximal nonempty intersection criterion similar to the step described in block 814. In this manner, the sounds of a new sentence are identified and associated with each word.

A SPL network demonstrates autonomous learning by forming new associations. In addition, a SPL network demonstrates autonomous learning behavior by modifying itself in response to unstructured external inputs, rather than only training inputs. It is possible to form new associations if the training sounds and images are repeatedly occurring in a new combination. For example, it is common that tables and chairs are found together. However, the SPL network is trained for tables and chairs individually, using method 810. The SPL network is trained to capture the new association, namely, that tables and chairs are usually together. If the association is represented within the SPL network a table image on the input surface triggers the set of dynamical loops for table and the chair, and vice versa. The SPL network is modified in a manner that satisfies the connectedness condition to solve the problem of association of tables and chairs.

Figure 24:
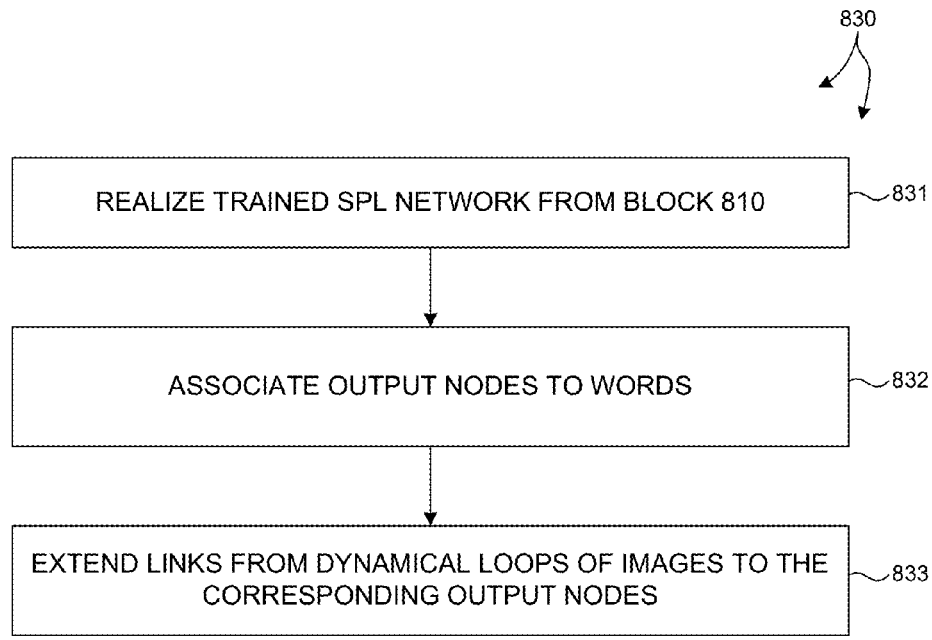
FIG. 24 is illustrative of a method 830 of associating images with words using an SPL network.

In another example, images are associated with words. FIG. 24 is illustrative of a method 830 of associating images with words using an SPL network as described herein.

At block 831, a trained SPL network is realized using the image recognition method of block 810 for a given training set of images.

At block 832, create association of output nodes to memory locations for words that correspond to images in the training set. For example, we associate the memory location for the word 'table' to a specific output node, word 'chair' to another different output node and so on. The output nodes are operable to generate a visual expression of the words (e.g., 'chair' or 'table').

At block 833, the dynamical loops for each given image from the training set are extended to the output surface by adding any of nodes and connections as discussed herein. For example, the dynamical loops corresponding to a table image from the training set are extended to the corresponding output node identified with the word 'table' in block 832.

When the input surface receives a new image, the SPL network identifies a foreground image from a background image and displays the word corresponding to the image on the output surface. The pathways extending from the dynamical loops corresponding to a given image automatically extend to the output surface to generate the correct word (e.g., 'table' and 'chair').

Figure 25:
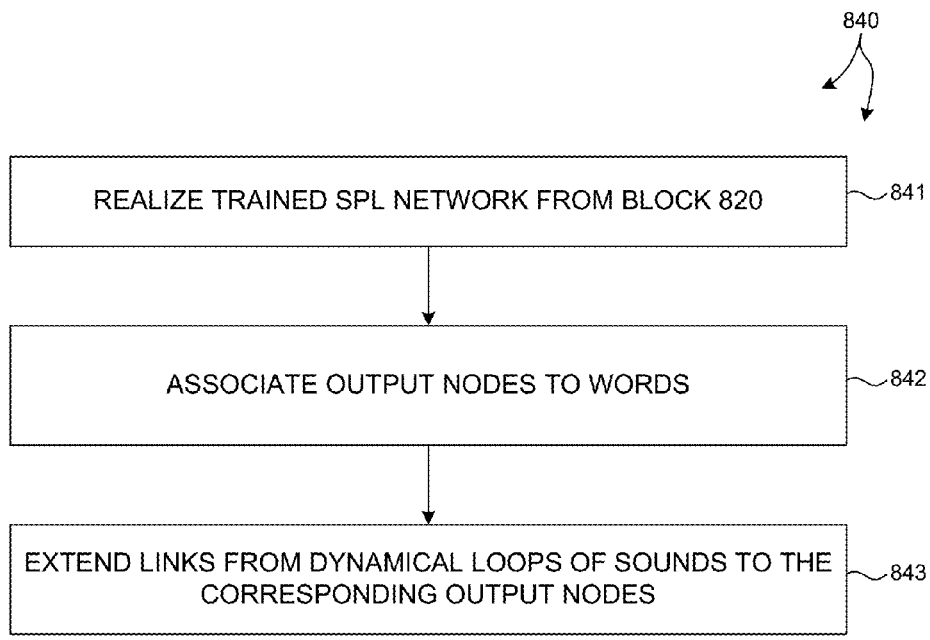
FIG. 25 is illustrative of a method 840 of associating sounds and speech with words using an SPL network.

In another example, sounds are associated with words. FIG. 25 is illustrative of a method 840 of associating sounds and speech with words using an SPL network as described herein.

At block 841, a trained SPL network is realized using the sound recognition method of block 820 for a given training set of sounds/speech.

At block 842, create association of output nodes to memory locations of the words that represent the sounds/speech in the training set. For example, we associate the memory location for the word 'table' to a specific output node, word 'chair' to another different output node and so on. The output nodes are operable to generate a visual expression of the words (e.g., 'chair' or 'table').

At block 843, the dynamical loops for each given sound/speech from the training set are extended are extended to the output surface by adding any of nodes and connections as discussed herein. For example, the dynamical loops corresponding to a table image from the training set are extended to the corresponding output node identified with the word 'table' in block 842.

When the input surface receives sounds from a new sentence, dynamic loops associated with the sounds are triggered and the SPL network displays the word corresponding to the sounds on the output surface. The pathways extending from the dynamical loops corresponding to a given sound automatically extend to the output surface to generate the correct word (e.g., 'table' and 'chair'). In another example, images are associated with sounds.

Figure 26:
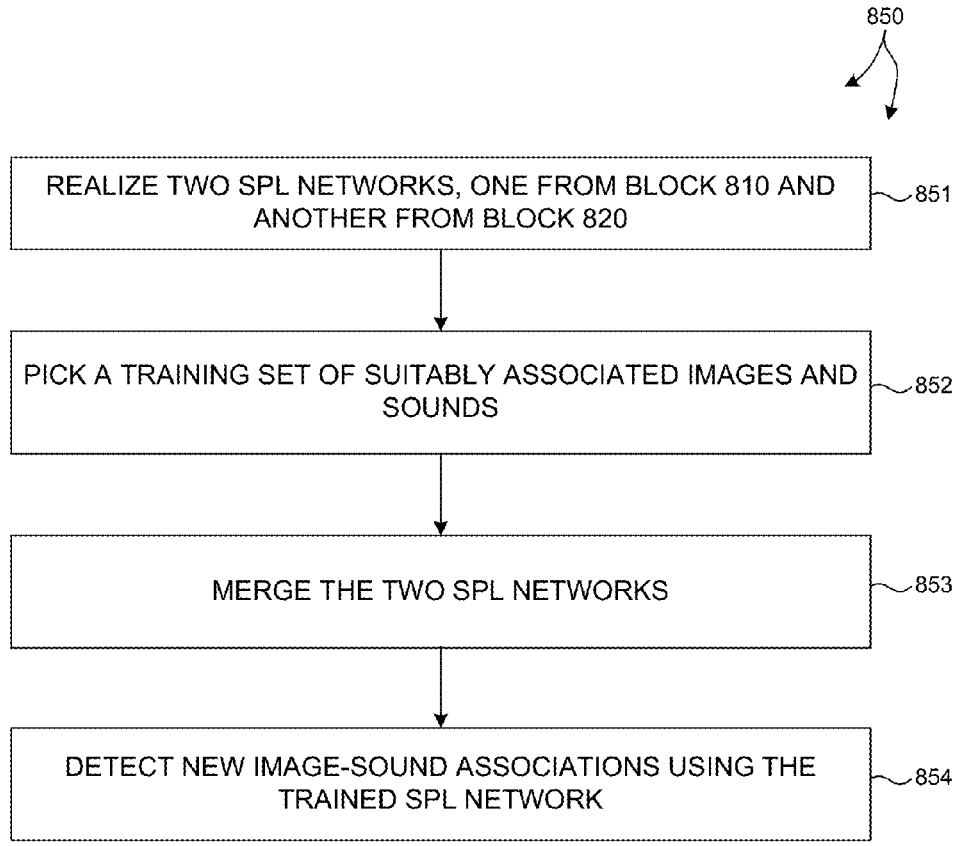
FIG. 26 is illustrative of a method 850 of associating images with sounds using an SPL network.

FIG. 26 is illustrative of a method 850 of associating images with sounds using an SPL network as described herein. Two or more SPL networks are merged in compliance with the connectedness condition. It is possible to either train the association with training data or automatically by exposing the input surfaces to the given inputs at approximately the same time and repeatedly.

At block 851, two trained SPL networks, one for a training set of images and another for a training set of sounds are realized using methods described in blocks 810 and 820. The input surface for images is different from the input surface for sounds.

At block 852, choose a new training set in which each training element has both a sound and an image. The previous two training sets had one or the other, but not both. The choice of the training elements corresponds to what is common in the external world. For example, one training element is a combination of a car image with a car sound. Another element is a ball image combined with a ball bouncing sound.

At block 853, create a new SPL network that merges the two SPL networks of block 851 that satisfies the connectedness condition. When a training element such as a car image and car sound falls on the combined SPL network, the set of dynamical loops triggered are just the union of the two individual sets of dynamical loops. The union is a disjoint union. Specifically, the two sets of dynamical loops are disconnected. The SPL network is modified to ensure that the two sets of dynamical loops are connected by adding any of nodes and connections. When the connectedness condition is satisfied, triggering one set of dynamical loops (e.g., those associated with the car image) will automatically trigger the associated set of dynamical loops (e.g., those associated with the car sound). This creates an association between a car image with a car sounds. The merged SPL network is trained for all elements of the new training set.

At block 854, the merged SPL network is applied to inputs other than the training inputs to create new associations using the connectedness detector. When a new combination of external inputs fall on the merged SPL network, the set of dynamical loops will, in general, be disconnected. The connectedness detector determines a disconnected set of dynamical loops. If the same set of disconnected dynamical loops reappears, any of new nodes and new connections are added to join the disconnected set of dynamical loops.

Human learn that if we see such a combination of inputs occurring at about the same time in a repetitive manner, we memorize the relationship. For example, since we always see chairs along the four sides of the table, not along the four corners of the table, we memorize this association. If someone places chairs at the four corners of a table, it immediately strikes us as odd. This is because of our memory of the typical arrangement. If we just see a table, we naturally turn our eyes and head around and expect to see four chairs along the four sides. This behavior is represented within the SPL network by satisfying the connectedness condition for repetitive combination scenarios. This representation can also be viewed as a way to detect approximate simultaneity of events.

In general, the SPL network may continuously modify itself to create associative relationships based on everyday external inputs (like a combination of two sounds, two images like tables and chairs or one sound and one image). In this manner, there is no need to explicitly create new combination training sets and then manually train the SPL network.

Figure 27:
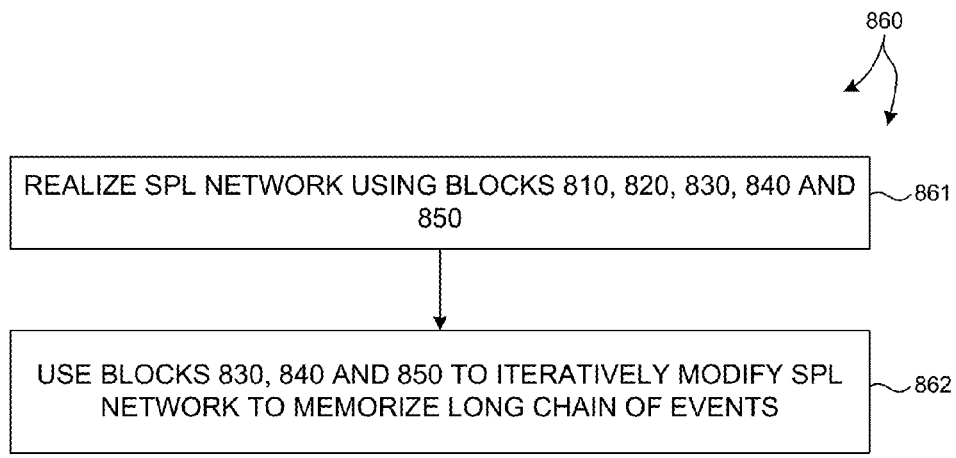
FIG. 27 is illustrative of a method 860 of creating memory of a chain of events using an SPL network.

FIG. 27 is illustrative of a method 860 of creating memory of a chain of events using an SPL network as described herein. As discussed hereinbefore, a set of dynamical loops can be used as a memory of an image or sound. The links between dynamical loops are additional sources of memory. They correspond to memory of relationships of two or more sounds and images. Method 860 describes how to memorize a chain of events.

At block 861, a trained SPL network realizing image recognition (block 810), sound/speech recognition (block 820), autonomous learning applications like associating images to words (block 830), associating sounds to words (block 840) and associating images to sounds (block 850) is picked.

At block 862, the SPL network is modified to memorize a long chain of events. We generalize the associative memory of two images and sounds to multiple image/sound combination along a long sequence of timeline. By adding any of nodes and connections in compliance with the connectedness condition, the SPL network is altered by concatenating the set of dynamical loops pairwise until we form a long chain corresponding to an event composed of sounds, images and words.

Block 861 includes a specific set of SPL networks to be subject to modification in block 862, however, in general any combination of different SPL networks may be selected in block 861 for modification in accordance with block 862.

Figure 28:
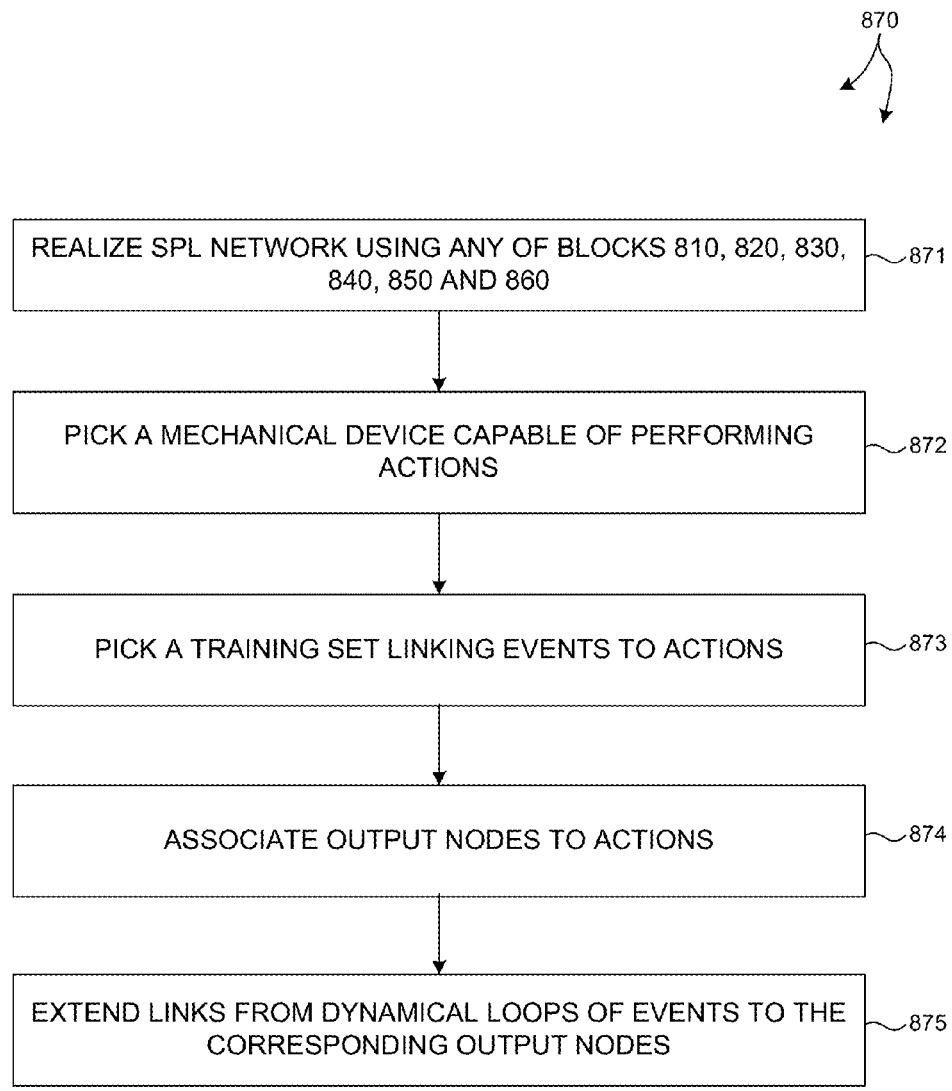
FIG. 28 is illustrative of a method 870 of performing actions in response to image, sound/speech or a textual input using an SPL network.

FIG. 28 is illustrative of a method 870 of performing actions in response to image, sound/speech or a textual input using an SPL network as described herein.

At block 871, any of a trained SPL network realizing image recognition (block 810), sound/speech recognition (block 820), autonomous learning applications like associating images to words (block 830), associating sounds to words (block 840), associating images to sounds (block 850) and for creating memory of a long chain of events (block 860) is selected.

At block 872, an existing mechanical device capable of performing a collection of actions is picked. Exemplary actions include moving left, right, top, bottom, turning and others that are feasible with a given mechanical system. Other exemplary actions include an ability to draw on a screen using a set of motion patterns in a plane. Exemplary mechanical devices include robots and other mechanical devices arranged to produce motion.

At block 873, a training set is created based on the collection of actions of block 872. Each element in the training set associates images, sounds, speech, words and long chain of events to the actions of block 872.

At block 874, associate output nodes with commands that make the mechanical device perform actions. For example, if a certain digital command (e.g., a method call in a software program) is executed to produce a leftward movement, then we create a specific output node that links to that digital command. Thus, if the output node becomes active, the output signal from the output node is translated into a signal that triggers the digital command to produce a leftward movement.

At block 875, the dynamical loops triggered within the SPL network of block 871 that require an action as specified in the training set of block 873 are extended by adding any of nodes and connections to the output nodes of block 873. For example, if the input is a word called 'turn left', the output is an action performing a left turn by the mechanical device. If the input is a sound called 'turn left', the output is once again the action of turning left. The same applies with all other action based elements from the training set.

Once the SPL network is trained to perform these actions, it becomes possible for the system to choose which inputs (e.g., image input surface, sound input surface, etc.) to process rather than simply processing any input that falls on the input surface. For example, if an image includes several familiar objects, the system is capable of processing them in the order of the associative relationships memorized within the SPL network. For example, the SPL network may cause itself to be moved which causes the image input surfaces to change focus from a 'table' in the image, say, to a 'chair' also in the image.

Figure 29:
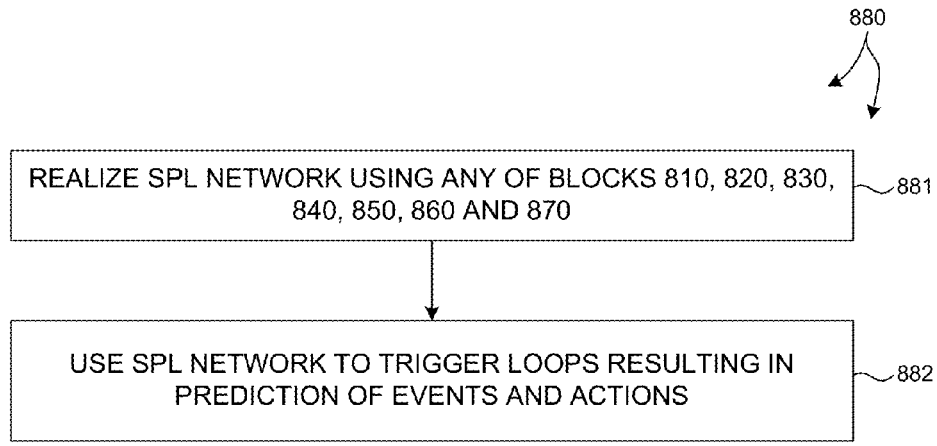
FIG. 29 is illustrative of a method 880 of predicting future events and actions in response to image, sound/speech or a textual input using an SPL network.

FIG. 29 is illustrative of a method 880 of predicting future events and actions in response to image, sound/speech or a textual input using an SPL network as described herein. The SPL network is capable of behaving as a predictive system using the associative relationships stored as links between dynamical loops for a sequence of steps. These relationships align with the external events as described in block 860.

At block 881, a trained SPL network realizing any of image recognition (block 810), sound/speech recognition (block 820), autonomous learning applications like associating images to words (block 830), associating sounds to words (block 840), associating images to sounds (block 850), for creating memory of a long chain of events (block 860) and performing actions (block 870) is picked.

At block 882, the resulting SPL network is used to predict future events and actions in response to a chain of events. As the trained SPL network receives external inputs, the set of dynamical loops corresponding to the object in question is initially triggered. However, the existence of links between dynamical loops memorized through past events are automatically triggered, especially those that originate from the dynamic loops associated with the current objects. These subsequent loops predict what the next likely object or event might be. The predictions may or may not be correct. If the actual external inputs do confirm the predictive loops, the corresponding nodes are already beyond the threshold state. This makes the subsequent predictions easier and faster. If, however, the actual external input turns out to disagree with the predictive loops, the new set of loops triggered corresponds to the correct future external input. This causes new predictive loops to be triggered via the memorized links.

In another example, sensory loops may be combined with action loops to produce interesting predictive features. For example, when table image dynamical loops are triggered, the relationship links will trigger the action loops to make the input surface move (block 870) to where the chairs might be. This prediction results from the links between the relative locations of chairs and tables, which was memorized through repetitive past scenarios (blocks 850 and 860). The prediction need not necessarily be correct, but the system can move the input surface autonomously in a natural direction aligned with the external world.

A sentence with one arrangement of words is understandable (e.g., 'I like to eat pizza tonight'), yet the same words in another arrangement are not understandable (e.g., 'pizza to like I tonight eat'). A person in command of the English language understands the former sentence but not the latter, even though the latter sentence is a simple rearrangement of individually familiar words from the former sentence.

In the sentence 'I like to eat pizza tonight', when we hears the word 'I', we are able to predict, 'I want . . . ', 'I like . . . ', 'I am . . . ' and others as immediate possibilities. Next, when we hear 'I like', we can predict 'I like music . . . ', 'I like to . . . ' and others as possibilities. For 'I like to', the nonempty choices are 'I like to do . . . ', 'I like to play . . . ' and others. For 'I like to eat', the nonempty predictions are 'I like to eat candies . . . ', 'I like to eat ice cream . . . ' and so on. Similarly, we have nonempty predictions for the rest of the sentence as well. The choices need not be correct at every instant relative to the sentence you are hearing.

On the other hand, the sentence 'pizza to like I tonight eat' is not understandable. When we hear 'pizza', the nonempty predictions are 'pizza is . . . ', 'pizza has . . . ' and others. However, the moment we hear the next word 'pizza to', we have lost all our predictions. We have an empty set of predictions. The situation does not improve when we hear 'pizza to like' or 'pizza to like I' and so on.

For a person trained in a particular language (e.g., English), the fundamental difference between any grammatically correct sentence and an ill-formed sentence is that a sentence we understand has nonempty predictions if we break the sentence up word-for-word in a linear order. This applies to all languages. Thus, an ability to understand grammatically correct sentences is based on an ability to predict the next word.

The SPL network discussed with reference to FIG. 29 is capable of predicting at any particular instant. This capability can be used to build predictions for words in a sentence. This gives rise to an ability to create grammatically correct sentences.

Abstractions are continuous if their dynamical loops within an SPL network produce a nonempty predictive set of dynamical loops along most linear subsequences. These subsequences are either implicitly present (e.g., a language) or explicitly created (e.g., a 2D image) within the abstraction.

Figure 30:
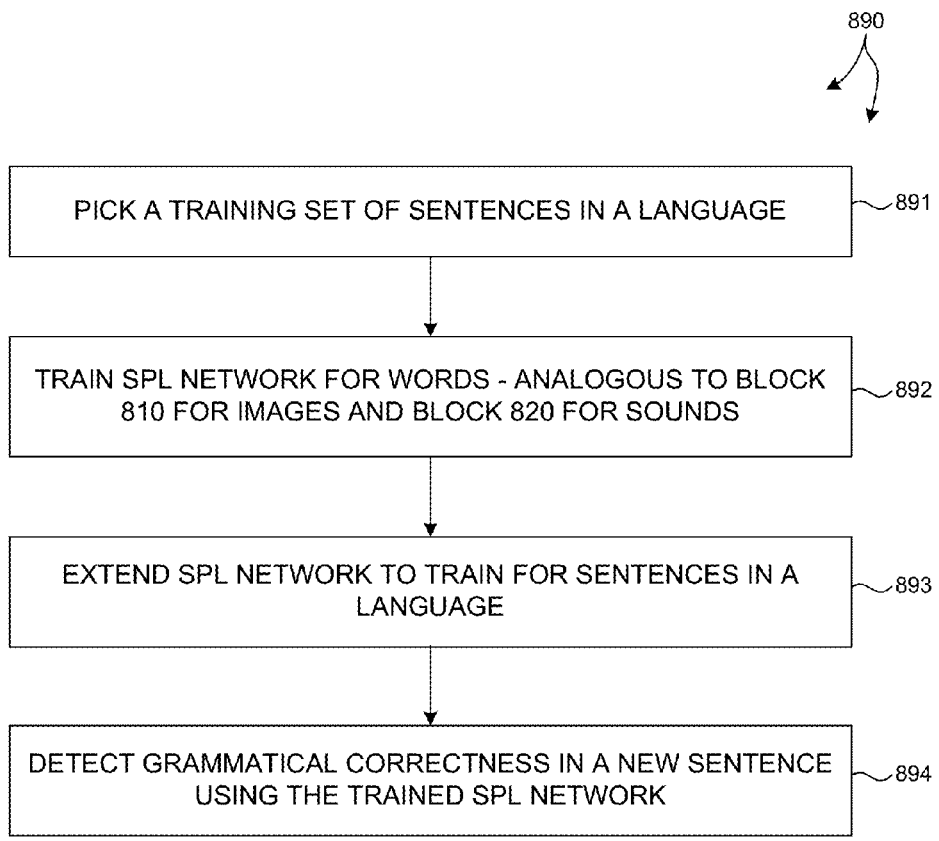
FIG. 30 is illustrative of a method 890 of creating an SPL network guaranteed to have abstract continuity for sentences in a language.

FIG. 30 is illustrative of a method 890 of creating an SPL network guaranteed to have abstract continuity for sentences in a language.

At block 891, a training set of sentences in a given language are selected. For example, the training set may be selected by extracting sentences from a textbook, newspaper, books, or everyday usage.

At block 892, an SPL network that is previously trained for the words that appear in these sentences is realized using the approach taken in blocks 810 (for images) and 820 (for sounds/speech), but followed for a training set of words in a language. Each distinct word produces a unique set of dynamical loops that satisfy similarity and dissimilarity conditions. The dynamical transformations used when training in compliance with the similarity condition are variations resulting from different handwritings, different fonts and font sizes. The dissimilarity condition is satisfied whenever one or more letter in the word differs.

We may choose to train an SPL network based on a visual representation of words (using handwritings and fonts) or through sound representation (based on how the words sound). In the sound based training sets for words, the dynamical variations for similarity conditions are based on different accents.

At block 893, the SPL network is trained for sentences by extending the SPL network of block 892 (using words visually and/or through speech). The method is analogous to those followed for creating a memory of a long chain of events (block 860). Since a sentence is a special linear sequence of words, as the entire sentence falls as inputs on the input surface, each of the dynamical loops for each of the words is triggered in the same time order. However, they are, in general, disjoint from each other. These sets of dynamical loops for words in the sentence must be linked together in the sequence of the sentence. The SPL network is trained for a given sentence when the connectedness condition is satisfied for the set of dynamical loops representing words in the sentence by adding appropriate nodes and connections.

Similarly, the SPL network is trained for each sentence is the training set. The resulting SPL network guarantees abstract continuity for a large collection of sentences. If the network receives a sentence like 'I like to eat pizza tonight' in a linear order, the set of dynamical loops triggered at the instant when the word 'I' is received will include 'I like', 'I want', 'I am' and others. When the next word reaches the input surface i.e., 'I like' reaches the network, the set of dynamical loops triggered will now be 'I like to', 'I like music' and others. The previous 'I want' and 'I am' dynamical loops will die down, whereas the previous dynamical loops for 'I like' do not die down because it is retriggered. In other words, the dynamical loops for the correct predictions continue to sustain whereas the incorrect predictions decay and disappear.

In general, a SPL network may be trained to have nonempty predictions for multi-word subsequences (e.g., 2-word subsequences, 3-word subsequences, etc.). For example, in the sentence 'I like to eat pizza tonight', all 2-word sequences are 'I like', 'like to', 'to eat', 'eat pizza' and 'pizza tonight'. Each of these 2-word sequences may satisfy the connectedness condition (i.e., nonempty predictive set of dynamical loops) as well. The 3-word sequences are 'I like to', 'like to eat', 'to eat pizza' and 'eat pizza tonight'. Each of these 3-word sequences may also satisfy the connectedness condition. Similarly, all 4-word sequences are 'I like to eat', 'like to eat pizza' and 'to eat pizza tonight'. Once again, each of these 4-word sequences may satisfy the connectedness condition.

At block 894, the trained SPL network is used to detect if a new sentence is grammatically correct. If it is a grammatically correct sentence, the SPL network will generate nonempty predictive set of dynamical loops at each word (block 880). This is equivalent to saying that the connectedness condition is satisfied at all times as the sentence inputs are received in the linear order. If it is grammatically incorrect sentence, the connectedness condition is not satisfied at some stage within the sentence and the set of dynamical loops become disconnected. This can be detected and the conclusion is drawn that the new sentence is grammatically incorrect.

In this manner, a trained SPL network can be used to check if a sentence is grammatically correct. It can also be used to create a grammatically correct sentence by using performing an action (e.g., block 870). In this case, the action is generating sounds corresponding to a well-formed grammatically correct sentence in a trained language.

In another example, a SPL network may be used to associate words and sentences with physical objects, images, sounds, actions, and features from the external world. As described hereinbefore, the SPL network may associate images with sounds (block 850), images to words (block 830) and sounds to words (block 840) automatically. In block 870, a SPL network associates actions with images, sounds and words as well. Using method 890, a SPL network may associate sentences with images, sounds and actions as well. A SPL network is modified in compliance with the connectedness condition generate appropriate connections among dynamical loops triggered in a linear sequence. Exemplary linear sequences include the timeline for sentences, actions and any other dynamics in the external world.

As discussed herein the overall architecture of a stable parallel looped (SPL) network is described with reference to specific details. However, a person of ordinary skill in the art would realize that a SPL network could be practiced without one or more of these details. Therefore, the purpose of the details should be viewed as a way to achieve a deeper understanding of the invention, not to restrict it. In addition, to avoid complicating the descriptions unnecessarily, some features known to persons with ordinary skill in the art are not described in detail. Several exemplary embodiments are presented herein that adhere to the dynamic loop property. However, variations of the presented embodiments and other implementations may be contemplated that adhere to the dynamic loop property.

For explanatory purposes in this patent document, stable parallel looped dynamical systems are described with reference to a directed graph or network executed by a computer (e.g., single CPU, multiple CPUs, or other specialized clocked electronic hardware). However, stable parallel looped dynamical systems may be defined for mechanical, chemical, electronic and other types of physical systems as well.

In one or more exemplary embodiments, the functions described may be implemented in hardware, software, firmware, or any combination thereof. If implemented in software, the functions may be stored on or transmitted over as one or more instructions or code on a computer readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic di storage or other magnetic storage devices or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. For example, the tools for debugging, monitoring the network, detecting the loops, visualizing the network, building and simulating the network, storing and retrieving the geometric and other tuning parameters information, detecting connectedness, adding/deleting new nodes and connections and others described above may be implemented in the same computer or a different one. If these tools are in a different computer, an ability to communicate with the network of nodes using standard network protocols such as HTTP, HTTPS, RPC, XML based, serialization techniques or any other proprietary packet communication protocols for sending and receiving raw binary packets through appropriate ports via socket connections may be used. Accordingly, various modifications, adaptations, and combinations of various features of the described embodiments can be practiced without departing from the scope of the invention as set forth in the claims.

What is claimed is:

1. A method comprising:
   receiving a plurality of input signals on a plurality of input nodes of a first Stable Parallel Loop (SPL) network;
   generating a first plurality of persistent dynamic loops formed among a plurality of internal nodes of the SPL network based at least in part on the plurality of input signals;
   generating a first plurality of output signals on a plurality of output nodes of the SPL network based on the first plurality of persistent dynamic loops; and
   modifying a property of the SPL network such that the modified SPL network satisfies a similarity condition among a set of training data, wherein the satisfying of the similarity condition involves detecting at least one common dynamic loop present in the modified SPL network for each element of the set of training data.

2. The method of claim 1, wherein each of the first plurality of persistent dynamic loops includes a plurality of active interconnected internal nodes that form a closed directed pathway.

3. The method of claim 2, wherein each of the plurality of persistent dynamic loops remains active for a greater period of time than any other closed directed pathway within the first SPL network after removal of the input signals from the first SPL network.

4. The method of claim 1, further comprising:
generating a second plurality of output signals based on a second plurality of persistent dynamic loops formed among a second plurality of internal nodes of the modified SPL network based at least in part on the plurality of input signals, wherein a number of persistent dynamic loops of the second plurality of persistent dynamic loops is different from a number of persistent dynamic loops of the first plurality of persistent dynamic loops.

5. The method of claim 1, wherein the property is selected from the group consisting of a number of internal nodes of the SPL network and a number of directed connections of the SPL network.

6. A method comprising:
receiving a plurality of input signals on a plurality of input nodes of a Stable Parallel Loop (SPL) network;
generating a first plurality of persistent dynamic loops formed among a plurality of internal nodes of the SPL network based at least in part on the plurality of input signals;
generating a first plurality of output signals on a plurality of output nodes of the SPL network based on the first plurality of persistent dynamic loops; and
modifying a property of the SPL network such that the modified SPL network satisfies a dissimilarity condition between a first set of training data and a second set of training data, wherein the satisfying of the dissimilarity condition involves detecting a persistent dynamic loop present in the modified SPL network for all elements of the first set of training data that is not present in the modified SPL network for all elements of the second set of training data.

7. The method of claim 6, wherein the property is selected from the group consisting of a number of internal nodes of the SPL network and a number of directed connections of the SPL network.

8. A method comprising:
receiving a plurality of input signals on a plurality of input nodes of a Stable Parallel Loop (SPL) network;
generating a first plurality of persistent dynamic loops formed among a plurality of internal nodes of the SPL network based at least in part on the plurality of input signals;
generating a first plurality of output signals on a plurality of output nodes of the SPL network based on the first plurality of persistent dynamic loops; and
merging the first SPL network and a second SPL network wherein the merging involves satisfying a connectedness condition, wherein the satisfying of the connectedness condition involves:
detecting a first persistent dynamic loop formed among a plurality of internal nodes of the first SPL network based at least in part on a first plurality of input signals;
detecting a second persistent dynamic loop formed among a plurality of internal nodes of the second SPL network based at least in part on a second plurality of input signals; and
connecting the first persistent dynamic loop and the second persistent dynamic loop if the first plurality of input signals and the second plurality of input signals are caused by repeatedly linked events.

9. A non-transitory, computer-readable medium comprising:
code for causing one or more computers to receive a plurality of input signals on a plurality of input nodes of a first Stable Parallel Loop (SPL) network;
code for causing the one or more computers to generate a first plurality of persistent dynamic loops formed among a plurality of internal nodes of the first SPL network based at least in part on the plurality of input signals;
code for causing the one or more computers to generate a first plurality of output signals on a plurality of output nodes of the first SPL network based on the first plurality of persistent dynamic loops; and
code for causing the one or more computers to modify a property of the SPL network such that the modified SPL network satisfies a similarity condition among a set of training data, wherein the satisfying of the similarity condition involves detecting at least one common dynamic loop present in the modified SPL network for each element of the set of training data.

10. The non-transitory, computer-readable medium of claim 9, wherein each of the first plurality of persistent dynamic loops includes a plurality of active interconnected internal nodes that form a closed directed pathway.

11. The non-transitory, computer-readable medium of claim 10, wherein each of the plurality of persistent dynamic loops remains active for a greater period of time than any other closed directed pathway within the first SPL network after removal of the input signals from the first SPL network.

12. The non-transitory, computer-readable medium of claim 9, further comprising:
code for causing the one or more computers to generate a second plurality of output signals based on a second plurality of persistent dynamic loops formed among a second plurality of internal nodes of the modified SPL network based at least in part on the plurality of input signals, wherein a number of persistent dynamic loops of the second plurality of persistent dynamic loops is different from a number of persistent dynamic loops of the first plurality of persistent dynamic loops.

13. The non-transitory, computer-readable medium of claim 9, wherein the property is selected from the group consisting of a number of internal nodes of the SPL network and a number of directed connections of the SPL network.

14. A non-transitory, computer-readable medium comprising:
code for causing one or more computers to receive a plurality of input signals on a plurality of input nodes of a Stable Parallel Loop (SPL) network;
code for causing the one or more computers to generate a first plurality of persistent dynamic loops formed among a plurality of internal nodes of the SPL network based at least in part on the plurality of input signals;
code for causing the one or more computers to generate a first plurality of output signals on a plurality of output nodes of the SPL network based on the first plurality of persistent dynamic loops; and
code for causing the one or more computers to modify a property of the SPL network such that the modified SPL network satisfies a dissimilarity condition between a first set of training data and a second set of training data, wherein the satisfying of the dissimilarity condition involves detecting a persistent dynamic loop present in the modified SPL network for all elements of the first set of training data that is not present in the modified SPL network for all elements of the second set of training data.

15. A non-transitory, computer-readable medium comprising:
- code for causing one or more computers to receive a plurality of input signals on a plurality of input nodes of a first Stable Parallel Loop (SPL) network;
- code for causing the one or more computers to generate a first plurality of persistent dynamic loops formed among a plurality of internal nodes of the SPL network based at least in part on the plurality of input signals;
- code for causing the one or more computers to generate a first plurality of output signals on a plurality of output nodes of the first SPL network based on the first plurality of persistent dynamic loops; and
- code for causing the one or more computers to merge the first SPL network and a second SPL network, wherein the merging involves satisfying a connectedness condition, wherein the satisfying of the connectedness condition involves:
    - detecting a first persistent dynamic loop formed among a plurality of internal nodes of the first SPL network based at least in part on a first plurality of input signals;
    - detecting a second persistent dynamic loop formed among a plurality of internal nodes of the second SPL network based at least in part on a second plurality of input signals; and
    - connecting the first persistent dynamic loop and the second persistent dynamic loop if the first plurality of input signals and the second plurality of input signals are caused by repeatedly linked events.

16. A Stable Parallel Loop (SPL) network engine, comprising:
- a plurality of input nodes, wherein a plurality of input signals are received on the plurality of input nodes;
- a plurality of internal nodes comprising a Stable Parallel Loop (SPL) network including a plurality of active interconnected internal nodes arranged in a closed directed pathway, wherein the plurality of active interconnected internal nodes form a persistent dynamic loop based at least in part on the plurality of input signals; and
- a plurality of output nodes, wherein an output signal is generated on at least one of the plurality of output nodes based at least in part on the persistent dynamic loop, wherein the SPL network satisfies a dissimilarity condition between a first set of training data and a second set of training data, wherein the satisfying of the dissimilarity condition involves detecting a persistent dynamic loop present in the SPL network for all elements of the first set of training data that is not present in the SPL network for all elements of the second set of training data.

17. The SPL network engine of claim 16, wherein the persistent dynamic loop remains active for a greater period of time than any other closed directed pathway within the SPL network after removal of the plurality of input signals from the plurality of input nodes.

* * * * *